(12) United States Patent
Kojima

(10) Patent No.: US 12,292,709 B2
(45) Date of Patent: *May 6, 2025

(54) TEMPERATURE CONTROL DEVICE AND IMAGE FORMING APPARATUS INCLUDING THE TEMPERATURE CONTROL DEVICE

(71) Applicant: TOSHIBA TEC KABUSHIKI KAISHA, Tokyo (JP)

(72) Inventor: Takeshi Kojima, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,278

(22) Filed: Nov. 14, 2023

(65) Prior Publication Data

US 2024/0077821 A1    Mar. 7, 2024

Related U.S. Application Data

(63) Continuation of application No. 18/071,684, filed on Nov. 30, 2022, now Pat. No. 11,852,997.

(30) Foreign Application Priority Data

Jan. 6, 2022    (JP) .................................. 2022-001105

(51) Int. Cl.
  *G03G 15/00*    (2006.01)
  *G03G 15/20*    (2006.01)
(52) U.S. Cl.
  CPC ......... *G03G 15/55* (2013.01); *G03G 15/2039* (2013.01)
(58) Field of Classification Search
  CPC ........................... G03G 15/55; G03G 15/2039
  See application file for complete search history.

(56) References Cited

U.S. PATENT DOCUMENTS 9,975,351 B1 *   5/2018   Luedeman ......... B41J 11/00216
11,561,493 B1 *  1/2023   Kojima ............... G03G 15/205
(Continued)

FOREIGN PATENT DOCUMENTS

| JP | 2002-174984 | 6/2002 |
| JP | 2003-308948 | 10/2003 |
| JP | 2003-345171 | 12/2003 |

OTHER PUBLICATIONS

Extended European Search Report for European Patent Application No. 23150534.8 dated May 19, 2023.

*Primary Examiner* — Stephanie E Bloss
*Assistant Examiner* — Michael A Harrison
(74) *Attorney, Agent, or Firm* — Amin, Turocy & Watson, LLP

(57) ABSTRACT

A device to supply power to a heater of a fixing device with a heater power supply circuit configured to supply power to the heater; a temperature sensor to measure a detected temperature from the temperature control target; a temperature estimation circuit to estimate an estimated temperature value of the temperature control target by the detected temperature; a control signal generation circuit to output a control signal for controlling the power supplied by the heater power supply circuit based on the estimated temperature value of the temperature control target estimated by the temperature estimation circuit and the target temperature; and a temperature abnormality detection circuit to determine whether an abnormality exists in the temperature sensor or on a circuit side based on a comparison result of the detected temperature acquired by the temperature sensor and the estimated temperature value.

20 Claims, 12 Drawing Sheets

(56) References Cited

U.S. PATENT DOCUMENTS 11,852,997 B2 * 12/2023 Kojima .............. G03G 15/2039
2021/0200123 A1 7/2021 Kadowaki

* cited by examiner

TEMPERATURE CONTROL DEVICE AND IMAGE FORMING APPARATUS INCLUDING THE TEMPERATURE CONTROL DEVICE

CROSS-REFERENCE TO RELATED APPLICATIONS

This application is a Continuation of application Ser. No. 18/071,684 filed on Nov. 30, 2022, the entire contents of which are incorporated herein by reference.

This application is based upon and claims the benefit of priority from Japanese Patent Application No. 2022-001105, filed on Jan. 6, 2022, the entire contents of which are incorporated herein by reference.

FIELD

Embodiments described herein relate generally to a temperature control device and an image forming apparatus including the temperature control device.

BACKGROUND

The image forming apparatus includes a fixing device that fixes a toner image on a recording medium by applying heat and pressure to the recording medium onto which the toner image is transferred. The fixing device includes a rotating body for fixing (heat roller), a pressure member (press roller), a heating member (lamp or IH heater, and the like), a temperature sensor, and the like. The temperature sensor detects a surface temperature of the heat roller. A controller that controls the fixing device controls the surface temperature of the heat roller to become a target value by increasing or decreasing the amount of power supplied to a heating member, based on a detected signal by the temperature sensor (temperature sensor signal).

The temperature control device that controls the fixing device includes an abnormality detection device that detects an abnormality or failure of the fixing device by the detection signal from the temperature sensor. For example, Japanese Unexamined Patent Application Publication No. 2003-308948 describes a technique for determining that there is an abnormality in a heating means or a detecting means if the maximum output value continues for the set time or more and the like even if a control result of a heating target does not become an abnormal value. If a detected temperature of the heat roller of the fixing device acquired from the temperature sensor exceeds a preset range, the temperature control device first determines that there is an abnormality in the fixing device, checks for breakage of the temperature sensor or heat source, and checks for an abnormality in the wiring of the fixing device, determines that the fixing device is not abnormal, and then determines whether there is a failure on a control circuit (triac, and the like) side.

DETAILED DESCRIPTION

Figure 1:
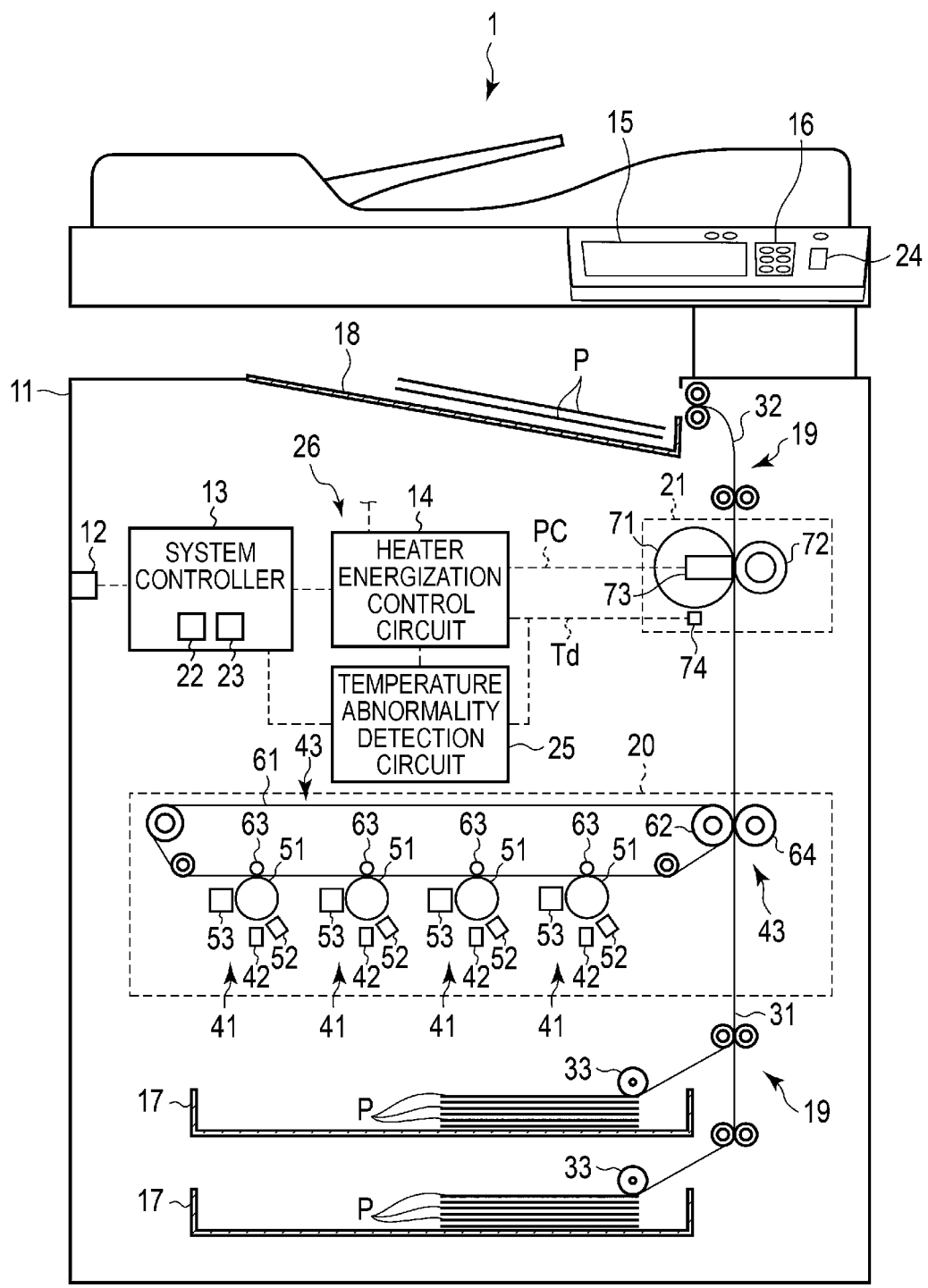
FIG. 1 is a diagram conceptually illustrating an overall configuration example of an image forming apparatus according to an embodiment.

Embodiments provide a temperature control device that can determine whether there is an abnormality in a temperature sensor or on a circuit side by comparing a current temperature difference, which is obtained from a difference between a detected temperature acquired by the temperature sensor and an estimated WAE temperature value, with a threshold value, and an image forming apparatus including the temperature control device.

In general, according to one embodiment, there is provided a temperature control device including a heater power supply circuit, a temperature sensor, a control signal generation circuit, a temperature estimation circuit, and a temperature abnormality detection circuit. The temperature control device is configured to supply power to a heater of a fixing device, thereby controlling a temperature control target to which heat is propagated from the heater so as to reach a preset target temperature. The heater power supply circuit is configured to supply power to the heater. The temperature sensor is configured to measure a detected temperature from the temperature control target. The temperature estimation circuit is configured to estimate an estimated temperature value of the temperature control target by the detected temperature, heat capacity of the heater based on energization to the heater, and a thermal resistance of the fixing device. The control signal generation circuit is configured to output an energization pulse for controlling the power supplied by the heater power supply circuit based on the estimated temperature value of the temperature control target estimated by the temperature estimation circuit and the target temperature. The temperature abnormality detection circuit is configured to compare a current temperature difference calculated from a current detected temperature and the estimated temperature value with a threshold value calculated from a detected temperature of the temperature sensor in normal time and the estimated temperature value and determine whether there is an abnormality in the temperature sensor or on a circuit side by the comparison result if the detected temperature detected by the temperature sensor is compared with a first threshold value and determined to be a low-temperature abnormal temperature or a high-temperature abnormal temperature.

A temperature control device of an embodiment includes a heater energization control circuit and a temperature abnormality detection circuit. The temperature control device is a device that performs temperature control of a fixing device mounted in the image forming apparatus by weighted average control with estimated temperature (WAE) control. The heater energization control circuit of the temperature control device controls a temperature of the fixing device using a control signal obtained by summing an estimated temperature value (estimated WAE temperature value) of the fixing device obtained by WAE control during operation and a detected temperature detected by a temperature sensor. The WAE control, as will be described later, is a technology that simulates a temperature of a member which is a temperature control target as a thermal CR circuit, and is temperature control of the fixing device using the estimated WAE temperature value obtained by estimating (computing) a surface temperature of a film unit which is a temperature control target from heat capacity C of a film unit corresponding to a heat roller of a heating target, a thermal resistance R of the fixing device, and input energy to the fixing device, and the like.

In addition, the temperature abnormality detection circuit determines whether the detected temperature acquired by the temperature sensor provided in the fixing device is a low-temperature abnormal temperature or a high-temperature abnormal temperature by a first threshold value Tth1. If the detected temperature is the low-temperature abnormal temperature or the high-temperature abnormal temperature, a current temperature difference is obtained from a current detected temperature and the estimated WAE temperature value. The current temperature difference is compared with a second threshold value Tth2 made up of an allowed temperature range with upper limit and lower limit set (hereinafter referred to as an allowable temperature range). If the current temperature difference is larger or smaller than the allowable temperature range of the second threshold value Tth2, it is determined that there is an abnormality on the circuit side. If the current temperature difference does not reach the second threshold value Tth2 and is within the allowable temperature range, it is determined that there is an abnormality in the temperature sensor.

Figure 2:
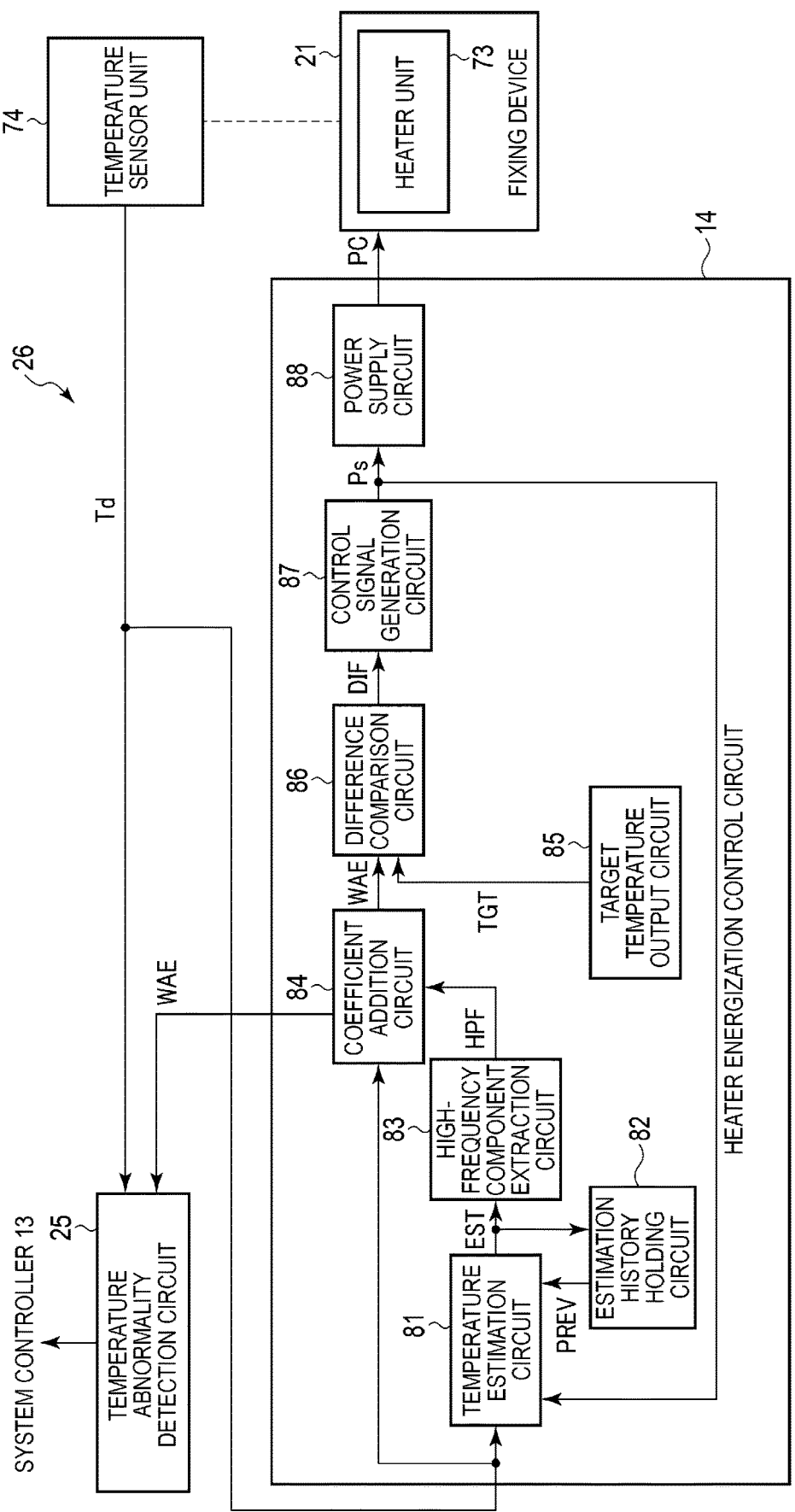
FIG. 2 is a block diagram illustrating a configuration example for performing WAE control and abnormal temperature detection.

The image forming apparatus including the temperature control device according to an embodiment will be described below with reference to the accompanying drawings. FIG. 1 is a diagram conceptually illustrating an overall configuration example of the image forming apparatus according to the embodiment, and FIG. 2 is a block diagram illustrating a configuration example of the temperature control device.

An image forming apparatus 1 is, for example, a multi-function printer (MFP) that performs various processing such as image formation while conveying a recording medium P such as printing paper. Alternatively, the image forming apparatus 1 is a solid-state scanning type printer (for example, LED printer) that can perform various processing such as image formation while conveying the recording medium P and that scans an LED array. These image forming apparatuses 1 are configured, for example, to receive toner from a toner cartridge and form an image on the recording medium P using the received toner. The toner may be a monochromatic toner, or may be a color toner of a plurality of colors such as cyan, magenta, yellow, and black. Further, the toner may be a decolorable toner that decolors a formed image if heat is applied after printing.

As illustrated in FIG. 1, the image forming apparatus 1 includes a housing 11, a communication interface 12, a system controller 13, a heater energization control circuit 14, a display unit 15, an operation interface 16, a plurality of paper trays 17, a paper discharge tray 18, a conveyance unit 19, an image forming unit 20, a fixing device 21, a main power switch 24 and a temperature abnormality detection circuit 25.

The housing 11 is a main body of the image forming apparatus 1. The housing 11 accommodates the communication interface 12, the system controller 13, the heater energization control circuit 14, the display unit 15, the operation interface 16, the plurality of paper trays 17, the paper discharge tray 18, the conveyance unit 19, the image forming unit 20, the fixing device 21, a processor 22, and the temperature abnormality detection circuit 25. The temperature control device 26 is configured with the heater energization control circuit 14, the temperature abnormality detection circuit 25, a heater unit 73, and a temperature sensor unit 74, and performs temperature control of the fixing device 21.

First, a configuration of a control system of the image forming apparatus 1 will be described.

The communication interface 12 is a connection device that enables communication with other devices such as a higher-level device (external device). The communication interface 12 includes, for example, a network connection terminal for wired connection by a LAN connector or the like. Furthermore, the communication interface 12 may have a function of performing a wireless communication with other devices according to standards such as Bluetooth (registered trademark) or Wi-fi (registered trademark).

The system controller 13 controls the whole of the image forming apparatus 1. The system controller 13 includes the processor 22 and a memory 23, for example.

A read-only non-volatile memory such as a read only memory (ROM), or a non-volatile memory that can be written and read at any time, such as a flash ROM, solid state drive (SSD), and hard disk drive (HDD), and a volatile memory that can be written and read at any time, such as a random access memory (RAM), can be applied to the memory 23, and these memories are appropriately combined to be used as the memory 23. The memory 23 stores a program and data used in the program. The memory 23 also functions as a working memory. That is, the memory 23 temporarily stores data being processed by the processor 22, a program executed by the processor 22, and the like.

The processor 22 is an arithmetic element such as a central processing unit (CPU), for example, and executes arithmetic processing.

The processor 22 functions as a control unit capable of executing various operations by executing the program stored in the memory 23. The processor 22 also uses the data stored in the memory 23 to perform various arithmetic processing and processing related to determination.

Further, for example, the processor 22 generates a print job based on an image acquired from an external device via the communication interface 12. The processor 22 stores the generated print job in the memory 23. The print job includes image data representing an image to be formed on the recording medium P. The image data may be data for forming an image on one sheet of recording medium P, or data for forming images on a plurality of sheets of recording medium P. Further, the print job includes information indicating whether printing is color printing or monochrome printing. Furthermore, the print job may include information such as the number of copies to be printed (number of page sets) and the number of copies to be printed per copy (number of pages).

The processor 22 generates print control information for controlling an operation of the conveyance unit 19, the image forming unit 20, and the fixing device 21 based on the generated print job. The print control information includes information indicating the timing of the passage of paper.

The processor 22 transmits the print control information to the heater energization control circuit 14.

The processor 22 functions as a controller (engine controller) that controls the operations of the conveyance unit 19 and the image forming unit 20 by executing the program stored in the memory 23. That is, the processor 22 controls the conveyance of the recording medium P by the conveyance unit 19, the image formation on the recording medium P by the image forming unit 20, and the like.

The image forming apparatus 1 may include the engine controller and the system controller 13 separately. In this case, the engine controller controls the conveyance of the recording medium P by the conveyance unit 19, the image formation on the recording medium P by the image forming unit 20, and the like. Further, in this case, the system controller 13 supplies information necessary for a control operation to the engine controller.

The image forming apparatus 1 includes a power conversion circuit that supplies a DC voltage to each component in the image forming apparatus 1 using an AC voltage of an AC power supply AC. The power conversion circuit supplies a DC voltage required for the operation of the processor 22 and the memory 23 to the system controller 13. The power conversion circuit also supplies a DC voltage required for the image formation to the image forming unit 20. The power conversion circuit supplies a DC voltage required for conveying the recording medium P to the conveyance unit 19. Further, the power conversion circuit supplies a DC voltage for driving the heater unit 73 of the fixing device 21 to the heater energization control circuit 14.

The heater energization control circuit 14 generates power PC and supplies the power PC to the heater unit 73 of the fixing device 21.

The display unit 15 includes a display that displays a screen according to a video signal input from the system controller 13. A graphic controller or the like may be used instead of the system controller 13. On the display of the display unit 15, for example, screens for various settings of the image forming apparatus 1 are displayed.

The main power switch 24 is a switch that supplies/cuts off power for driving the image forming apparatus 1 by ON/OFF operation. If the main power switch 24 is turned ON, the image forming apparatus 1 is started, and if the main power switch 24 is turned OFF, the image forming apparatus 1 stops driving. Further, by ON/OFF operation of the main power switch 24, the fixing device 21 is also started/stopped.

The operation interface 16 is connected to operation members described below. The operation interface 16 supplies an operation signal according to the operation of the operation member to the system controller 13. The operation members are, for example, a touch sensor, numeric keys, paper feed keys, various function keys, a keyboard, and the like. The touch sensor acquires information indicating a designated position within a certain region. The touch sensor is configured to be integrated with the display unit 15 as a touch panel, and inputs a signal indicating a touched position on the screen displayed on the display unit 15 to the system controller 13.

The plurality of paper trays 17 are cassettes that are detachably attached to the housing 11 and accommodate the recording media P of the same size or different sizes in respective cassette units. The paper tray 17 supplies the recording medium P to the conveyance unit 19. The paper discharge tray 18 is a tray that supports the recording medium P discharged from the image forming apparatus 1.

Next, a configuration for conveying the recording medium P of the image forming apparatus 1 will be described.

The conveyance unit 19 is a mechanism for conveying the recording medium P within the image forming apparatus 1. As illustrated in FIG. 1, the conveyance unit 19 includes a plurality of conveyance paths. For example, the conveyance unit 19 includes a paper feed conveyance path 31 and a paper discharge conveyance path 32.

The paper feed conveyance path 31 and the paper discharge conveyance path 32 are each configured with a plurality of motors, a plurality of rollers, and a plurality of guides. The plurality of motors rotate shafts under the control of the system controller 13, thereby rotating rollers driven by the rotation of the shafts. The plurality of rollers move the recording medium P by rotating. The plurality of guides prevent skewing of the recording medium P and the like during conveyance.

The paper feed conveyance path 31 takes in the recording medium P from each paper tray 17 by a pickup roller 33, and supplies the taken-in recording medium P to the image forming unit 20.

The paper discharge conveyance path 32 is a conveyance path for discharging the recording medium P on which an image is formed from the housing 11. The recording medium P discharged by the paper discharge conveyance path 32 is accommodated in the paper discharge tray 18.

Next, the image forming unit 20 will be described.

The image forming unit 20 forms an image on the recording medium P based on the print job generated by the processor 22. The image forming unit 20 includes a plurality of process units 41, a plurality of exposure devices 42, and a transfer mechanism 43. The image forming unit 20 includes the exposure device 42 for each process unit 41. The plurality of process units 41 and the plurality of exposure devices 42 have the same configuration.

First, the process unit 41 will be described.

The process units 41 are connected to toner cartridges that supply toners of different colors and form toner images. Each process unit 41 is provided for each toner color, and the plurality of process units 41 correspond to color toners, such as cyan, magenta, yellow, and black, respectively. The toner cartridge includes a toner storing container and a toner delivery mechanism. The toner storing container is a container for supplying stored toner. The toner delivery mechanism is a mechanism configured by a screw or the like for delivering the toner in the toner storing container.

Hereinafter, a set of process unit 41 and exposure device 42 will be described as a representative example.

The process unit 41 includes a photosensitive drum 51, an electrifying charger 52, and a developing device 53.

The photosensitive drum 51 is a photoreceptor composed of a cylindrical drum and a photosensitive layer formed on an outer peripheral surface of the drum. The photosensitive drum 51 is rotated at a constant speed by a driving mechanism configured by using gears, belts, and the like.

The electrifying charger 52 uniformly electrifies the surface of the photosensitive drum 51. For example, the electrifying charger 52 uses an electrifying roller to apply a voltage (development bias voltage) to the photosensitive drum 51, thereby electrifying the photosensitive drum 51 to a uniform negative potential (contrast potential). The electrifying roller rotates following the rotation of the photosensitive drum 51 in a state of applying a predetermined pressure to the photosensitive drum 51.

The developing device 53 is a device that causes toner to adhere to the photosensitive drum 51. The developing device 53 includes a developer container, a stirring mechanism, a developing roller, a doctor blade, an automatic toner control (ATC) sensor, and the like. The developer container is a container that receives and contains toner delivered from the toner cartridge. A carrier is contained in advance in the developer container. The toner delivered from the toner cartridge is stirred with the carrier by the stirring mechanism to form developer in which the toner and the carrier are mixed. The carrier is contained in the developer container if the developing device 53 is manufactured.

The developing roller rotates within the developer container and causes the developer to adhere to the surface thereof. The doctor blade is a member disposed at a predetermined distance from the surface of the developing roller. The doctor blade partially removes the top side of the developer adhered to the surface of the rotating developing roller. As a result, a developer layer having a constant thickness according to a distance between the doctor blade and the surface of the developing roller is formed on the surface of the developing roller.

The ATC sensor is, for example, a magnetic flux sensor that includes a coil and detects a voltage value induced across the coil. A detected voltage of the ATC sensor changes depending on the density of the magnetic flux from the toner inside the developer container. That is, the system controller 13 determines a concentration ratio of the toner remaining in the developer container to the carrier (toner concentration ratio), based on the detected voltage of the ATC sensor. Based on the toner concentration ratio, the system controller 13 operates the motor that drives the delivery mechanism of the toner cartridge to deliver the toner from the toner cartridge to the developer container of the developing device 53.

Next, the exposure device 42 will be described.

The exposure device 42 includes a plurality of light emitting elements. The exposure device 42 forms a latent image on the photosensitive drum 51 by irradiating the electrified photosensitive drum 51 with light from the light emitting element. The light emitting element is, for example, a light emitting diode (LED) or the like. One light emitting element is configured to irradiate one point on the photosensitive drum 51 with light. The plurality of light emitting elements are arranged in a main scanning direction parallel to a rotation axis of the photosensitive drum 51.

The exposure device 42 forms the latent image for one line on the photosensitive drum 51 by irradiating the photosensitive drum 51 with light from the plurality of light emitting elements arranged in the main scanning direction. Further, the exposure device 42 forms a latent image of a plurality of lines by continuously irradiating the rotating photosensitive drum 51 with light.

In the process unit 41 configured as described above, if a surface of the photosensitive drum 51 electrified by the electrifying charger 52 is irradiated with light from the exposure device 42, an electrostatic latent image is formed thereon. Furthermore, if the developer layer formed on the surface of the developing roller comes close to the surface of the photosensitive drum 51, the toner contained in the developer adheres to the latent image formed on the surface of the photosensitive drum 51. With this configuration, a toner image is formed on the surface of the photosensitive drum 51.

Next, the transfer mechanism 43 will be described.

The transfer mechanism 43 transfers the toner image formed on the surface of the photosensitive drum 51 onto the recording medium P. The transfer mechanism 43 includes a primary transfer belt 61, a secondary transfer opposing roller 62, a plurality of primary transfer rollers 63, and a secondary transfer roller 64, for example.

The primary transfer belt 61 is an endless belt wound around the secondary transfer opposing roller 62 and a plurality of winding rollers. An inner surface (inner peripheral surface) of the primary transfer belt 61 is in contact with the secondary transfer opposing roller 62 and the plurality of winding rollers, and an outer surface (outer peripheral surface) thereof is opposed to the photosensitive drum 51 of the process unit 41.

The secondary transfer opposing roller 62 is rotated using a motor as a drive source. The secondary transfer opposing roller 62 rotates to convey the primary transfer belt 61 in a predetermined conveyance direction. The plurality of winding rollers are configured to be freely rotatable. The plurality of winding rollers rotate as the primary transfer belt 61 is moved by the secondary transfer opposing roller 62.

The plurality of primary transfer rollers 63 each bring the primary transfer belt 61 into contact with the photosensitive drum 51 of the process unit 41. Specifically, the plurality of primary transfer rollers 63 are respectively provided at positions facing the photosensitive drums 51 of the corresponding process units 41 with the primary transfer belt 61 interposed therebetween. Each of the primary transfer rollers 63 contacts the inner peripheral surface of the primary transfer belt 61 and displaces the primary transfer belt 61 toward the photosensitive drum 51 side. With this configuration, each of the primary transfer rollers 63 brings the outer peripheral surface of the primary transfer belt 61 into contact with the photosensitive drum 51.

The secondary transfer roller 64 is provided at a position facing the secondary transfer opposing roller 62 with the primary transfer belt 61 interposed therebetween. The secondary transfer roller 64 contacts the outer peripheral surface of the primary transfer belt 61 and applies pressure thereto. With this configuration, a transfer nip, in which the secondary transfer roller 64 and the outer peripheral surface of the primary transfer belt 61 are in close contact with each other, is formed. The secondary transfer roller 64 presses the recording medium P passing through the transfer nip against the outer peripheral surface of the primary transfer belt 61 if the recording medium P passes through.

The secondary transfer roller 64 and the secondary transfer opposing roller 62 rotate to convey the recording medium P supplied from the paper feed conveyance path 31 with the recording medium P pinched therebetween. With this configuration, the recording medium P passes through the transfer nip.

In the transfer mechanism 43 configured as described above, if the outer peripheral surface of the primary transfer belt 61 contacts the photosensitive drum 51, the toner image formed on the surface of the photosensitive drum 51 is transferred to the outer peripheral surface of the primary transfer belt 61. If the image forming unit 20 includes a plurality of process units 41, toner images are transferred on the outer peripheral surface of the primary transfer belt 61 from the photosensitive drums 51 of the plurality of process units 41. The transferred toner image is conveyed by the primary transfer belt 61 to the transfer nip where the secondary transfer roller 64 and the outer peripheral surface of the primary transfer belt 61 are in close contact with each other. If the recording medium P exists in the transfer nip, the toner image transferred to the outer peripheral surface of the primary transfer belt 61 is transferred to the recording medium P at the transfer nip.

Next, the fixing device 21 of the embodiment will be described.

Figure 3:
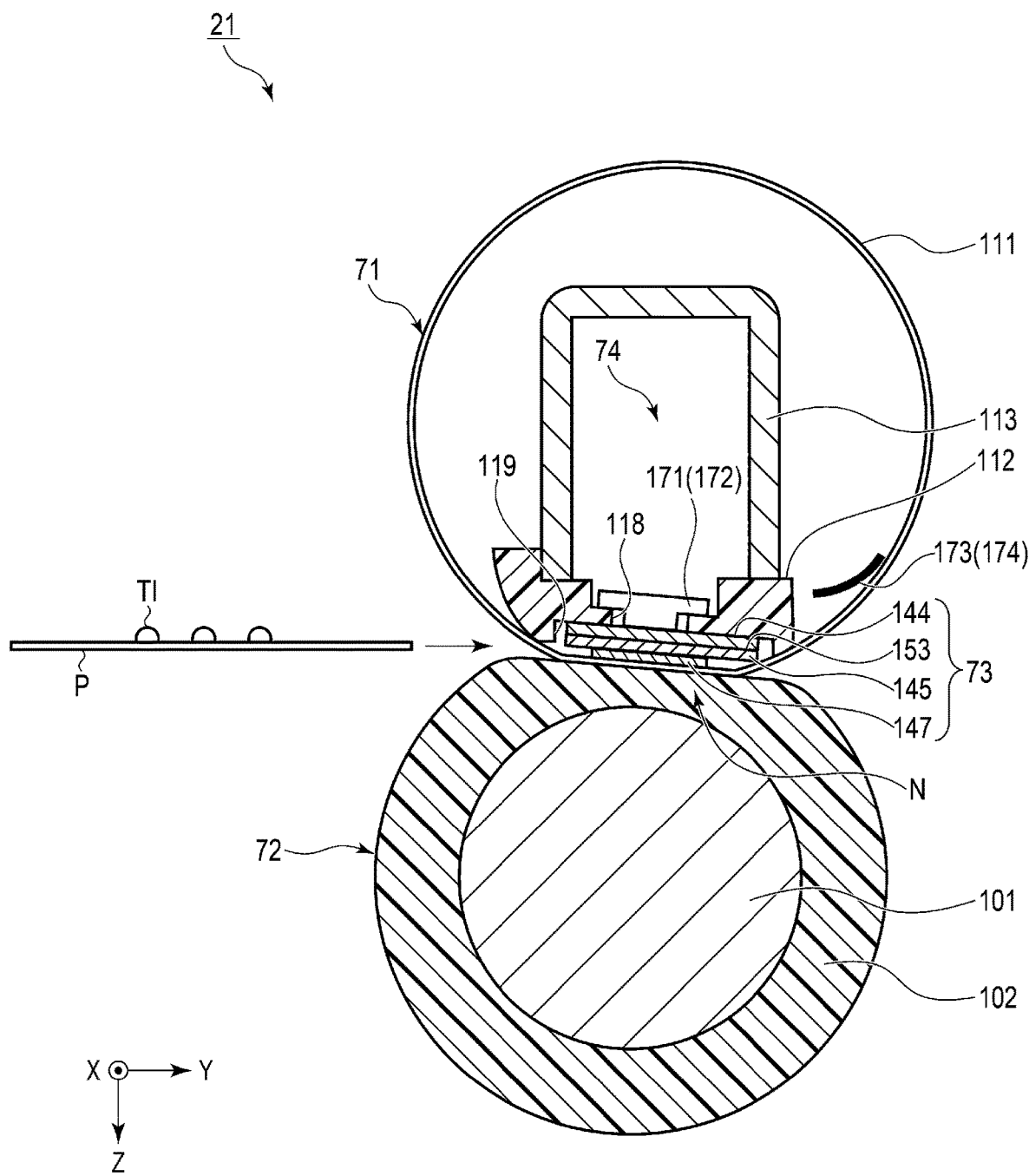
FIG. 3 is a diagram illustrating a configuration example of a fixing device.
Figure 4:
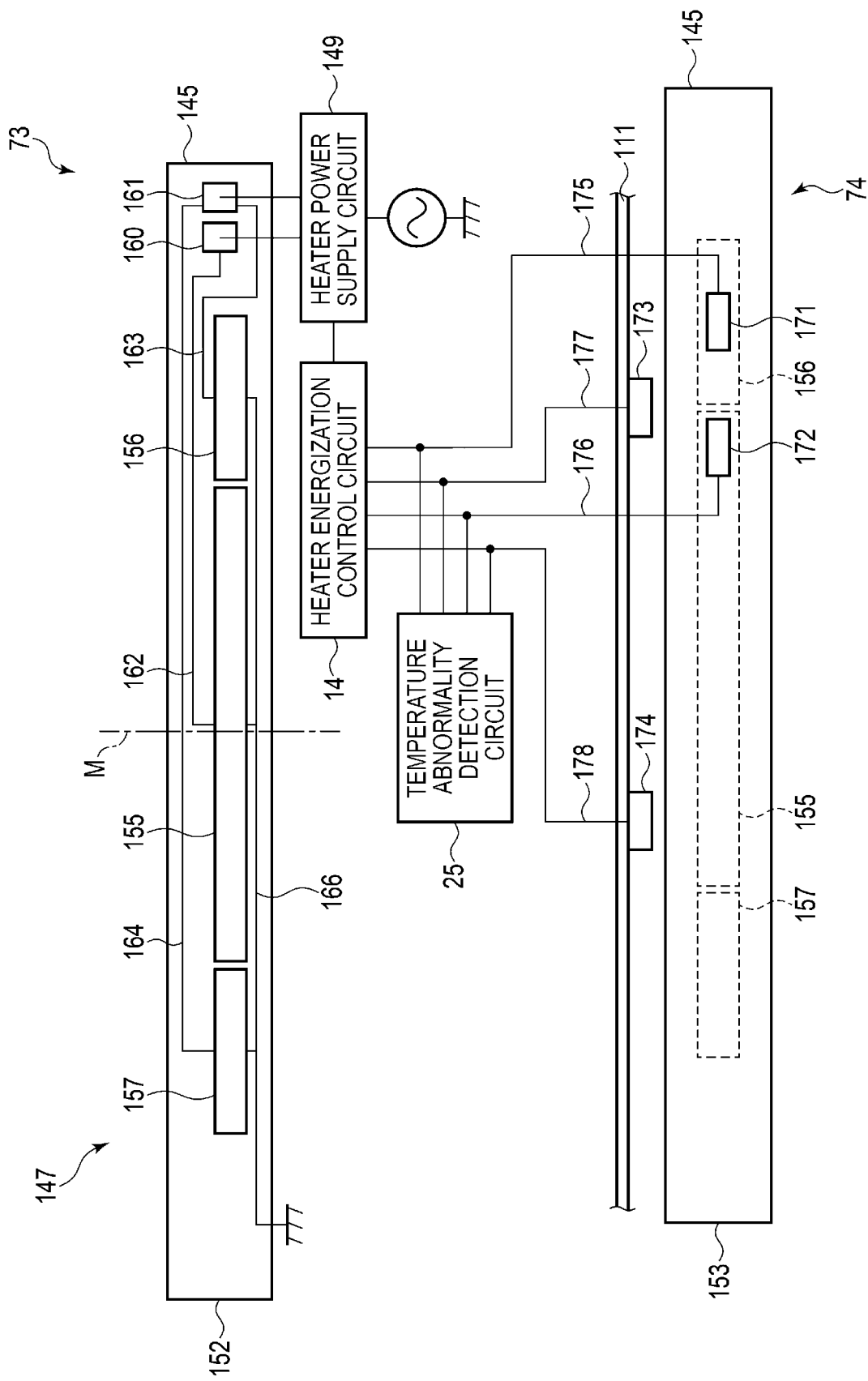
FIG. 4 is a diagram illustrating a disposition of heaters and temperature sensors.
Figure 5:
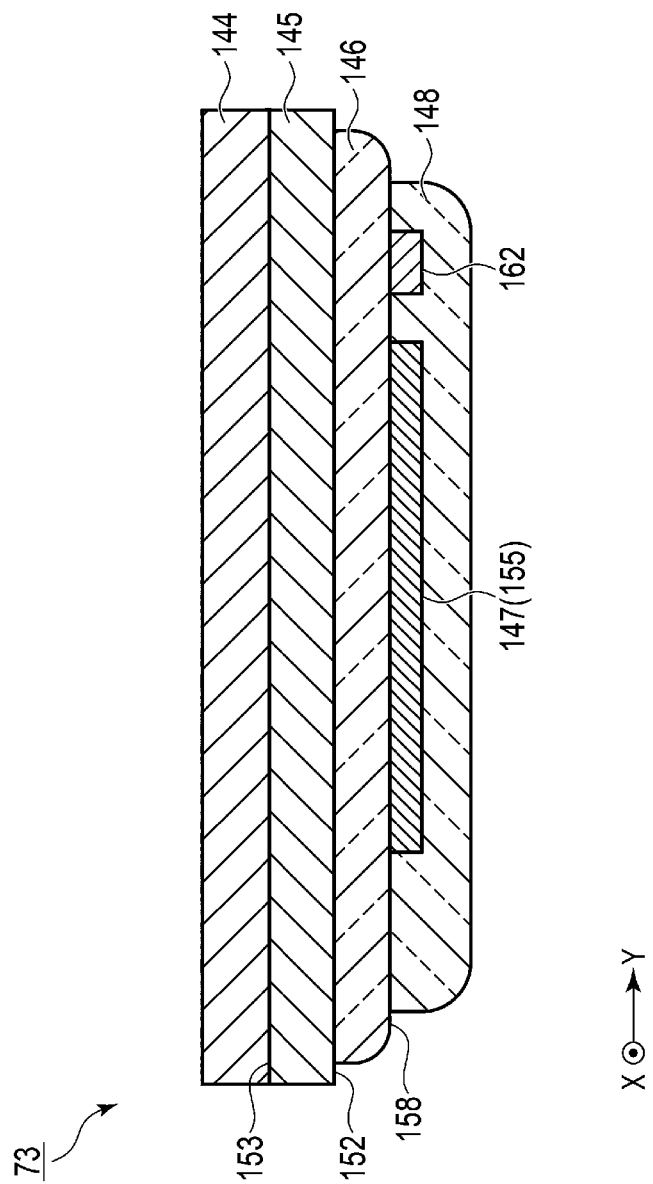
FIG. 5 is a cross-sectional view illustrating a configuration of a heater unit.

FIG. 3 is a diagram illustrating a cross-sectional configuration of the fixing device 21. FIG. 4 is a diagram illustrating a configuration example of a heater unit. FIG. 5 is a cross-sectional view of the heater unit illustrated in FIG. 3. Here, the cross-sectional configuration of the fixing device 21 in the X-axis direction perpendicular to the conveyance direction of the recording medium P is illustrated.

The fixing device 21 is mainly configured with a film unit 71 corresponding to a heat roller and a pressure roller 72.

The pressure roller 72 abuts on the film unit 71, which is a temperature control target, to form a nip N. The pressure roller 72 is rotated by a driving source such as a motor, and the film unit 71 is rotated by following the rotation of the pressure roller 72. The recording medium P is conveyed by the rotation of the pressure roller 72 and rotation of the film unit 71. In this case, the pressure roller 72 presses a toner image TI from the back side of the recording medium P that enters the nip N.

The pressure roller 72 includes a core bar 101 and an elastic layer 102. The core bar 101 is formed, in a columnar shape, of a metal material such as stainless steel. The elastic layer 102 is provided on the outer peripheral surface of the core bar 101.

Both ends of the core bar 101 in the X-axis direction are rotatably supported by bearings or the like provided thereon, respectively. The core bar 101 is rotated by a motor and drive mechanism. The drive mechanism is provided with, for example, an elliptical cam member. The cam member can move the core bar 101 in a radial direction by rotating to switch between an abutting state in which the core bar 101 is brought into abutment with the film unit 71 or a separated state in which the abutment is released.

The elastic layer 102 is formed to have a constant thickness using an elastic material such as silicone rubber. A release layer is formed on the outer peripheral surface of the elastic layer 102. The release layer is formed of a resin material such as tetrafluoroethylene/perfluoroalkyl vinyl ether copolymer (PFA).

The pressure roller 72 forms the nip N with the film unit 71 by being brought into abutment with the film unit 71 by the cam member and pressed by an elastic member such as a pressure spring. The pressure of the nip N is a pressure that enables fixing processing, and is preferably 400N, for example. The state in which the nip N is formed is the abutting state between the pressure roller 72 and the film unit 71.

Further, the separated state between the pressure roller 72 and the film unit 71 is used if jamming of the recording medium P occurs in the fixing device 21 during operation. That is, the cam member is rotated to separate the pressure roller 72 and the film unit 71 to remove the recording medium P. Similarly, if the fixing device 21 is in an operation standby state, the pressure roller 72 is separated from the film unit 71 to prevent plastic deformation of a tubular film 111, which will be described later.

The film unit 71 includes the tubular film (tubular body) 111, a heater unit 73, a support member 112, a stay 113, and the temperature sensor unit 74. The film unit 71 heats the toner image TI on the recording medium P that enters the nip N. Here, in FIG. 4, a substrate 145, which will be described later, is illustrated two places in order to show the positions of the heater unit 73 and the like in an easy-to-understand manner.

The tubular film 111 has a tubular shape, and is formed in a laminated structure of a base layer, an elastic layer, and a release layer in order from the inner peripheral side. Among these layers, the base layer is formed of a resin such as polyimide, or a metal such as nickel or stainless steel. The elastic layer is formed of an elastic material such as silicone rubber. The release layer is formed of a material such as PFA resin. In order to shorten the warming-up time of the fixing device 21, the thickness of the elastic layer and the thickness of the release layer are appropriately set at the time of design so that the heat capacity of the elastic layer and the release layer is not too large. In order to improve frictional slidability of the film unit 71 with respect to the heater unit 73 and the support member 112, the inner peripheral surface (surface of the base layer) of the tubular film 111 may be subjected to a coating treatment. The heat-resistant grease may be applied to the inner peripheral surface of the tubular film 111.

As illustrated in FIG. 4 or FIG. 5, the heater unit 73 of the fixing device 21 includes the substrate 145, a glass layer 146, a heating element set (heater) 147, a glass coat 148 and a heater power supply circuit 149. In the embodiment, in the heater unit 73, a heat transfer member 144 is provided on the substrate 145. The heater power supply circuit 149 is configured using, for example, a power semiconductor element such as a triac.

Of the components described above, the substrate 145 is formed in a strip-like plate shape using a metal material such as stainless steel or a ceramic material such as aluminum nitride. Hereinafter, a surface on a first side in the thickness direction of the substrate 145 is referred to as a first surface 152, and a surface on a second side opposite to the first side in the thickness direction of the substrate 145 is referred to as a second surface 153.

The substrate 145 is disposed within the tubular film 111 (radially inside the tubular film 111). The substrate 145 extends in the X-axis direction parallel to an axis of the tubular film 111. The glass layer 146 has electrical insulation properties and covers the first surface 152 of the substrate 145.

The heating element set 147 includes a first heater 155, a second heater 156, and a third heater 157. As illustrated in FIG. 4, the first to third heaters 155, 156, 157 are formed on a first surface 158, which is the surface of the glass layer 146 opposite to the substrate 145. The first to third heaters 155, 156, and 157 are disposed inside the tubular film 111, respectively.

Each of the first to third heaters 155, 156, and 157 is a heating resistor formed in a rectangular plate shape. For example, the first to third heaters 155, 156, 157 are formed on the glass layer 146 by screen printing silver, palladium alloy, or the like. As illustrated in FIG. 4, the first heater 155 is disposed in the center, and the third heater 157 and the second heater 156 are disposed on the left and right along the X-axis direction. In FIG. 4, the center of the heating element set 147 is indicated by a line M.

A resistance value of the first heater 155 is smaller than the resistance value of both the second heater 156 and the third heater 157. The resistance value of the second heater 156 and the resistance value of the third heater 157 are substantially the same.

As illustrated in FIG. 4, as a first system, the first heater 155 is connected to the heater energization control circuit 14 by a wiring 162 via a first contact 160. As a second system, the second and third heaters 156 and 157 are connected to the heater energization control circuit 14 via wirings 163 and 164 via a second contact 161. The second and third heaters 156 and 157 are electrically connected in parallel by the wirings 163 and 164. These contacts 160 and 161 and the wirings 162, 163, and 164 are respectively formed on the glass layer 146 by screen printing using silver or the like as a material. The first to third heaters 155, 156, and 157 are grounded by a wiring 166.

The first to third heaters 155, 156, and 157 are heated and controlled by driving power from the heater power supply circuit 149 controlled by the heater energization control circuit 14. As illustrated in FIG. 4, in the embodiment, since the circuit is separated into the first system of the first heater 155 and the second system of the second and third heaters 156 and 157, the first heater 155 and the second and third heaters 156 and 157 can be controlled individually.

A ratio of the resistance value of the first heater 155 to the resistance value of the second and third heaters 156 and 157 as a whole is preferably in a range of 1:3 to 1:7. More preferably, the ratio of the resistance value of the first heater 155 to the resistance value of the second and third heaters 156 and 157 as a whole is in a range of 1:4 to 1:6.

As illustrated in FIG. 5, the glass coat 148 is laminated and formed so as to cover the heating element set 147 and the wirings on the first surface 158 of the glass layer 146. In the cross-sectional configuration of FIG. 5, only the first heater 155 and the wiring 162 are illustrated for simplicity. The glass coat 148 has a function of protecting the heating element set 147 and the like and enhancing the slidability between the tubular film 111 and the heater unit 73.

In the heater unit 73 configured as described above, the glass coat 148 is disposed on a surface 73a (FIG. 6) that contacts the tubular film 111 from the inner side in the radial direction of the tubular film 111.

Subsequently, the configuration of the film unit 71 will be described.

As illustrated in FIG. 3, the support member 112 has a plate shape extending in the X-axis direction. A plurality of through-holes 118 and 119 with different diameters are formed in one hole in the support member 112 at intervals in the X-axis direction. One of the plurality of through-holes 118 and 119 is illustrated in FIG. 3. Among these through-holes, part of the first and second temperature sensors 171 and 172 are fixed by being fitted into the through-hole 118. The heater unit 73 and the heat transfer member 144 are fixed by being fitted the through-hole 119. The first and second temperature sensors 171 and 172 and a second surface 144b of the heat transfer member 144 are disposed so as to be in close contact with each other. That is, the support member 112 supports the heater unit 73 via the heat transfer member 144.

The support member 112 is formed of a member having rigidity, heat resistance and heat insulating property. For example, the support member 112 is formed of a resin material such as silicone rubber, fluororubber, polyimide resin, polyphenylene sulfide (PPS), polyether sulfone (PES), or liquid crystal polymer.

The support member 112 abuts on the inner peripheral surface of the tubular film 111 at both ends thereof in the Y-axis direction. The support member 112 is maintained by the stay 113 extending in the X-axis direction. The stay 113 has a U-shaped cross-section perpendicular to the X-axis direction, and is formed of a steel plate material or the like. The stay 113 is erected on the support member 112 with a U-shaped opening. Both ends of the stay 113 in the X-axis direction are fixed to the housing 11 of the image forming apparatus 1. With this configuration, the film unit 71 is supported by the image forming apparatus 1. The stay 113 improves bending rigidity of the film unit 71.

The stay 113 is formed, for example, by bending a steel plate having a thickness of 2.0 mm. By providing flanges near both ends of the stay 113 in the X-axis direction, movement of the tubular film 111 in the X-axis direction can be regulated.

Next, the temperature sensor unit 74 provided in the fixing device 21 will be described.

As illustrated in FIG. 3, the temperature sensor unit 74 is provided inside the fixing device 21. In the embodiment, although a configuration having a plurality of temperature sensors is illustrated, but the configuration is not limited thereto, a configuration in which one temperature sensor is provided to perform temperature control and abnormality detection may be adopted.

As illustrated in FIG. 4, the temperature sensor unit 74 includes a first temperature sensor 171 and second temperature sensor 172 disposed on the first and second heaters 155 and 156, and a third temperature sensor 173 and a fourth temperature sensor 174 disposed so as to be in contact with the inner peripheral surface of the tubular film 111. Thermistors are used as these first to fourth temperature sensors 171, 172, 173, and 174, for example. The thermistor is a general electronic component, and has, for example, a configuration in which a sensor main body is housed in a case and a temperature sensing portion is exposed. The first to fourth temperature sensors 171, 172, 173, and 174 are driven by DC power, for example.

As illustrated in FIG. 3, for example, parts of the first and second temperature sensors 171 and 172 are fitted into the through-hole 118 of the support member 112 and are in contact with the first heater 155. The first and second temperature sensors 171 and 172 detect temperatures of the first and second heaters 155 and 156, respectively. Each of the first and second temperature sensors 171 and 172 is connected to the heater energization control circuit 14 and the temperature abnormality detection circuit 25 by a pair of wirings (two wirings).

Further, each of the third and fourth temperature sensors 173 and 174 is disposed so as to be in contact with the inner surface of the tubular film 111, and detects an inner surface temperature of the tubular film 111. Each of the third and fourth temperature sensors 173 and 174 is also connected to the heater energization control circuit 14 and the temperature abnormality detection circuit 25 by a pair of wirings. The first to fourth temperature sensors 171, 172, 173, and 174 are connected to the heater energization control circuit 14 and the temperature abnormality detection circuit 25 by pairs of wirings 175, 176, 177, and 178, respectively.

These first to fourth temperature sensors 171, 172, 173, and 174 output a detected temperature Td to the heater energization control circuit 14 and temperature abnormality detection circuit 25 as a potential difference between a pair of wirings. The detected temperature Td may be an average value of detected temperatures detected by the first to fourth temperature sensors 171, 172, 173, and 174, and may be a value weighted by the disposed position of the temperature sensor. An estimated WAE temperature value, which will be described later, is calculated based on a design value (center value) of a parameter of the fixing device 21. Since a detected temperature actually measured in the fixing device 21 has individual variations due to a manufacturing error and the like, a certain amount of difference (deviation width) occurs. Such a difference can be eliminated by correcting a management width of the design value.

Figure 6:
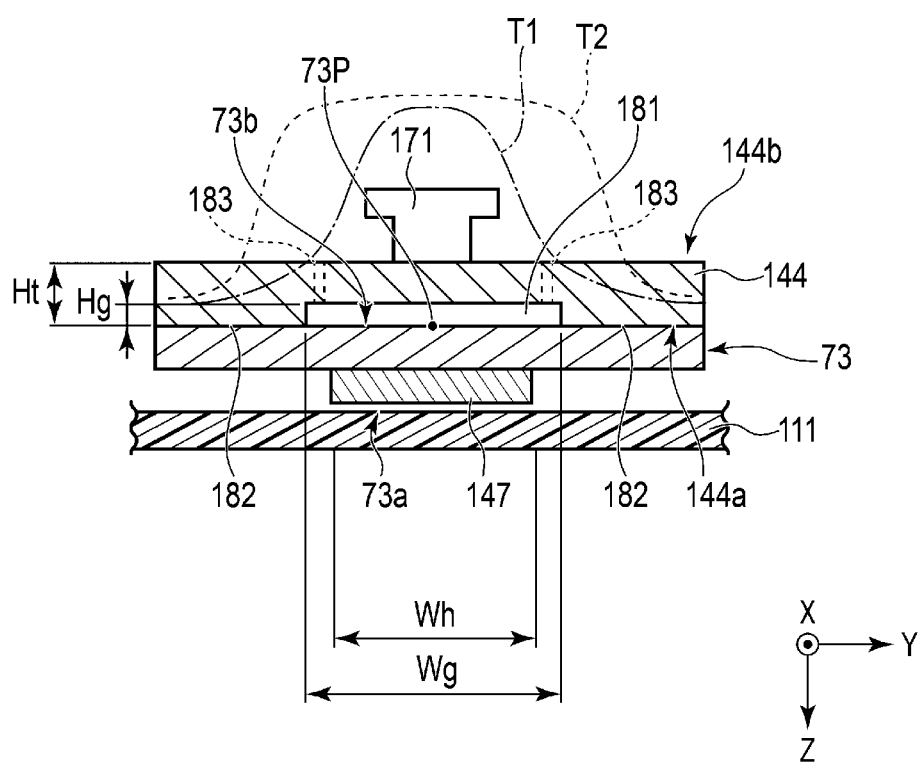
FIG. 6 is a cross-sectional view illustrating a configuration of a heat transfer member and the heater unit.

Next, the heat transfer member 144 and the heater unit 73 will be described with reference to FIG. 6. FIG. 6 is a cross-cross-sectional view illustrating the configuration of the heat transfer member 144 and heater unit 73.

The heat transfer member 144 is formed of a metal material with high thermal conductivity such as copper. An outer shape of the heat transfer member 144 is the same as the outer shape of the substrate 145 of the heater unit 73. The heat transfer member 144 includes a groove portion 181 on a first surface 144a in the Z-axis direction. In a space region defined by the groove portion 181, the first surface 144a of the heat transfer member 144 and the heater unit 73 are separated. A surface of the heat transfer member 144 other than the groove portion 181 is an abutment portion 182 that abuts on the heater unit 73.

If the image forming apparatus 1 starts printing, the heating element set 147 raises the temperature of the tubular film 111 to a fixation temperature. If the heating element set 147 generates heat from room temperature, the temperature distribution T1 at an initial stage of heat generation becomes mountain-shaped as indicated by the one-dot chain line. If warming-up is completed and the tubular film 111 is maintained at the fixation temperature, the temperature distribution T2 of the heating element set 147 becomes trapezoidal as indicated by the broken line.

These temperature distributions T1 and T2 indicate the temperature distribution in the Y-axis direction on the second surface 73b of the heater unit 73 in the Z-axis direction. As indicated by the temperature distribution T1, the temperature distribution of the second surface 73b of the heater unit 73 is mountain-shaped. A temperature peak position 73P coincides with the center of the heating element set 147 in the Y-axis direction. The groove portion 181 of the heat transfer member 144 is formed so as to cover the temperature peak position 73P of the heater unit 73.

If the groove portion 181 is not formed at the temperature peak position 73P, the heat transfer member 144 abuts on the temperature peak position 73P of the heater unit 73. In this case, most of the heat of heater unit 73 is transferred to the heat transfer member 144 and not transferred to the tubular film 111.

In contrast, if the groove portion 181 is formed at the temperature peak position 73P, most of the heat of the heater unit 73 is transferred to the tubular film 111 without being transferred to the heat transfer member 144. As a result, the tubular film 111 is efficiently heated, and thus the time required to start printing can be shortened. In the Z-axis direction illustrated in FIG. 6, a depth Hg of the groove portion 181 is preferably 20% to 50% of a thickness Ht of the heat transfer member 144. A width Wg of the groove portion 181 may be larger than a width Wh of the heating element set 147. With this configuration, most of the heat generated by the heating element set 147 is easily transferred to the tubular film 111 without being immediately transferred to the heat transfer member 144. Therefore, the tubular film 111 is efficiently heated.

The heating element set 147 is formed longer in the X-axis direction than the recording medium P having a maximum size in the X-axis direction. The groove portion 181 is formed longer than the heating element set 147 in the X-axis direction. The heat transfer member 144 is formed longer than the groove portion 181 in the X-axis direction. That is, the heat transfer member 144 extends outside the heating element set 147 in the X-axis direction. A cross-sectional area of a YZ cross-section (cross-section perpendicular to the X-axis direction) of the heat transfer member 144 in at least a part of an outer region of the heat element set 147 in the X-axis direction is defined as a first cross-sectional area. Specifically, the cross-sectional area of the YZ cross-section of the heat transfer member 144 in the outer region of the groove portion 181 in the X-axis direction is defined as the first cross-sectional area (cross-sectional area where the abutment portion 182 is located). On the other hand, the cross-sectional area of the YZ cross-section of the heat transfer member 144 in an inner region of the heating element set 147 in the X-axis direction is defined as a second cross-sectional area (cross-sectional area where the groove portion 181 is located). The heat transfer member 144 is formed such that the first cross-sectional area is larger than the second cross-sectional area (first cross-sectional area>second cross-sectional area).

The heat transfer member 144 also includes the abutment portion 182 that abuts on the heater unit 73 in the outer region of the groove portion 181 in the X-axis direction. The abutment portion 182 is a region where the groove portion 181 is not formed. Therefore, the first cross-sectional area of the YZ cross-section of the abutment portion 182 is larger than the second cross-sectional area (first cross-sectional area>second cross-sectional area) of the inner region (formation region of groove portion 181) of the heating element set 147 described above. With this configuration, the heat capacity of the abutment portion 182 becomes larger than the heat capacity of the region where the groove portion 181 is formed.

The heating element set 147 generates heat in a range wider than the size of the recording medium P in the X-axis direction. If the recording medium P passes through the fixing device 21, heat of the heater unit 73 is transferred to the recording medium P. Therefore, a passage region of the recording medium P is cooled, but a non-passage region of the recording medium P is not cooled. Both ends in the X-axis direction of the heater unit 73, which are the non-passage regions, are liable to become high temperature.

The heat transfer member 144 includes the abutment portion 182 in the outer region of the groove portion 181 in the X-axis direction. The heat at both ends of the heater unit 73 in the X-axis direction is easily transferred from the abutment portion 182 to the heat transfer member 144. Therefore, the temperature rise at both ends of the heater unit 73 in the X-axis direction is prevented.

The heat transfer member 144 abuts on the second surface 73b of the heater unit 73 over the entire periphery of the groove portion 181 by means of the frame-shaped abutment portion 182. Therefore, the groove portion 181 is sealed by the heater unit 73. The heat transfer member 144 includes the plurality of through-holes 183 arranged at regular intervals in the X-axis direction. These through-holes 183 pass through the heat transfer member 144 along the Z-axis direction and open to the inner surface of the groove portion 181. If the support member 112 is disposed in the Z-axis direction of the heat transfer member 144, a through-hole communicating with the through-hole 183 of the heat transfer member 144 is also formed in the support member 112. Air in the groove portion 181, which becomes high pressure due to the temperature rise, is discharged to the outside through these through-holes 183. Therefore, lifting of the abutment portion 182 of the heat transfer member 144 from the heater unit 73 is prevented. With this configuration, the heat of the heater unit 73 is transferred to the heat transfer member 144 via the frame-shaped abutment portion 182. Furthermore, a plurality of through-holes 183 are formed to open outward along the X-axis direction of the heating element set 147. Therefore, a thermal situation of the heating element set 147 in the Z-axis direction becomes substantially uniform along the X-axis direction. With this configuration, the tubular film 111 disposed in the Z-axis direction of the heating element set 147 is heated substantially uniformly along the X-axis direction.

Next, the heater energization control circuit 14 that performs WAE control will be described with reference to FIGS. 2 to 4. The heater energization control circuit 14 includes a temperature estimation circuit 81, an estimation history holding circuit 82, a high-frequency component extraction circuit 83, a coefficient addition circuit 84, a target temperature output circuit 85, a difference comparison circuit 86, a control signal generation circuit 87, and a power supply circuit 88.

The heater energization control circuit 14 generates power PC and outputs the power PC to the heater power supply circuit 149 of the heater unit 73 of the fixing device 21. A heat generation amount of the heater power supply circuit 149 is adjusted according to a power amount of the power PC and the temperature of the film unit 71 is controlled by the heater power supply circuit 149.

The detected temperature Td detected by the temperature sensor unit 74 is input to the heater energization control circuit 14. The detected temperature Td may be an average value of the detected temperatures detected by the first to fourth temperature sensors 171, 172, 173, and 174 described above, or may be an average value obtained by weighting (multiplying coefficient) the detected temperature according to the disposed position of the temperature sensor.

The temperature estimation circuit 81 performs temperature estimation processing for estimating the surface temperature of the film unit 71. The temperature estimation circuit 81 generates a temperature estimation result EST based on the detected temperature Td, an estimation history PREV, and an energization pulse Ps if WAE control is started. Further, the temperature estimation circuit 81 may be configured to generate the temperature estimation result EST based on the detected temperature Td, the estimation history PREY, the energization pulse Ps, and a voltage applied to the heater unit 73 if the energization pulse Ps is ON (rated voltage).

The estimation history holding circuit 82 holds a history of the temperature estimation result EST. The estimation history holding circuit 82 outputs the estimation history PREV, which is the history of the temperature estimation result EST (past temperature estimation result EST), to the temperature estimation circuit 81.

The high-frequency component extraction circuit 83 performs high-pass filter processing for extracting a high-frequency component of the temperature estimation result EST. The high-frequency component extraction circuit 83 outputs a high-frequency component HPF, which is a signal representing the extracted high-frequency component, to the coefficient addition circuit 84.

The coefficient addition circuit 84 performs coefficient addition processing, which serves as correction processing, on the detected temperature Td from the temperature sensor unit 74. The coefficient addition circuit 84 receives the detected temperature Td and the high-frequency component HPF from the high-frequency component extraction circuit 83. The coefficient addition circuit 84 corrects the detected temperature Td based on the high-frequency component HPF. Specifically, the coefficient addition circuit 84 multiplies the high-frequency component HPF by a preset coefficient, adds the result to the detected temperature Td, and calculates the estimated WAE temperature value. The coefficient addition circuit 84 outputs the estimated WAE temperature value to the difference comparison circuit 86 and the temperature abnormality detection circuit 25.

The target temperature output circuit 85 outputs a preset target temperature TGT to the difference comparison circuit 86.

The difference comparison circuit 86 performs difference computation processing. The difference comparison circuit 86 calculates a difference DIF between the target temperature TGT from the target temperature output circuit 85 and the estimated WAE temperature value from the coefficient addition circuit 84, and outputs the difference DIF to the control signal generation circuit 87.

The control signal generation circuit 87 generates the energization pulse Ps, which is a pulse signal for controlling energization of the heater unit 73, based on the difference DIF. The control signal generation circuit 87 outputs the energization pulse Ps to the power supply circuit 88 and the temperature estimation circuit 81.

The power supply circuit 88 outputs the power PC, which is a control signal, to the heater power supply circuit 149 of the heater unit 73, based on the energization pulse Ps. The heater power supply circuit 149 receives power supplied from the power supply and switches between a power supply state and a power non-supply state to the first to third heaters 155, 156, and 157, thereby controlling heating by heater unit 73. The power supply circuit 88 may be configured to be integrated with the heater power supply circuit 149 in the fixing device 21.

As described above, the heater energization control circuit 14 adjusts the amount of power to be supplied to the heater unit 73 of the fixing device 21, based on the detected temperature Td, the estimation history PREV of temperature, and the energization pulse Ps. Such control is called weighted average control with estimated temperature (WAE) control. Each of the temperature estimation circuit 81, the estimation history holding circuit 82, the high-frequency component extraction circuit 83, the coefficient addition circuit 84, the target temperature output circuit 85, the difference comparison circuit 86, and the control signal generation circuit 87 of the heater energization control circuit 14 can be configured not only by an electric circuit, but also by software (programs) stored in the processor 22. In this case, each circuit is constructed as a functional block.

Figure 9:
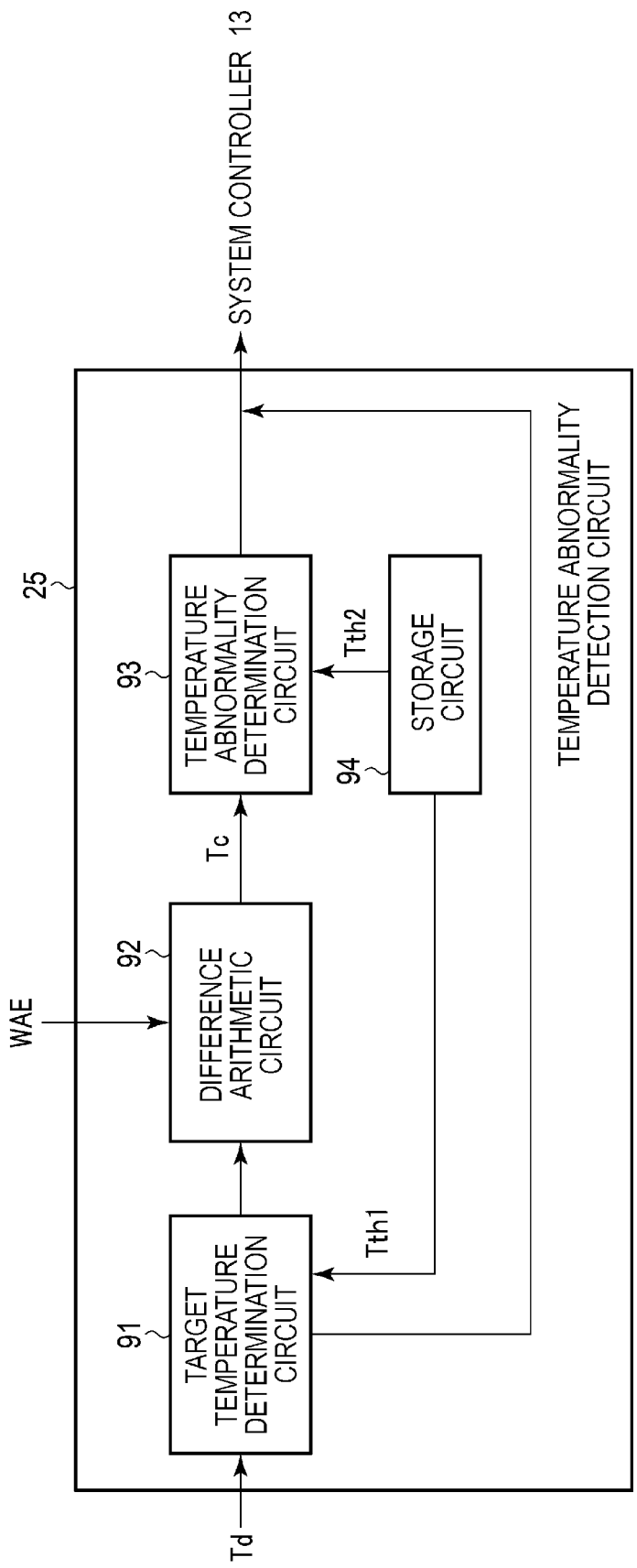
FIG. 9 is a block diagram illustrating a configuration example of an abnormality temperature detection device.

Next, the temperature abnormality detection circuit 25 will be described with reference to FIG. 9.

The temperature abnormality detection circuit 25 is configured with a target temperature determination circuit 91, a difference arithmetic circuit 92, a temperature abnormality determination circuit 93, and a storage circuit 94. In the following description, although an example in which each circuit is configured by an electric circuit is illustrated, each circuit can also be configured by software (program) stored in the processor 22. In this case, each circuit is constructed as a functional block.

The temperature abnormality detection circuit 25 compares the detected temperature Td acquired by the temperature sensor unit 74 provided in the fixing device 21 with a first threshold value described later to determine whether the detected temperature Td is a high-temperature abnormal temperature or a low-temperature abnormal temperature. If it is determined that the detected temperature Td is the high-temperature abnormal temperature or the low-temperature abnormal temperature, a current temperature difference Tc is obtained from the detected temperature Td and the estimated WAE temperature value. The current temperature difference Tc is compared with a threshold value (second threshold to be described later) to determine whether the current temperature difference is greater than or equal to the threshold, and whether the temperature sensor is abnormal or the circuit side including the heater energization control circuit is abnormal depending on a response situation of the detected temperature detected by the temperature sensor if the heater is turned ON/OFF.

The target temperature determination circuit 91 compares the detected temperature Td detected by the temperature sensor unit 74 with an allowable temperature range, which is a first threshold value Tth1 including the preset target temperature TGT. The first threshold value Tth1 is a threshold value used to determine whether the detected temperature Td is the high-temperature abnormal temperature or the low-temperature abnormal temperature.

The detected temperature Td that exceeds the allowable temperature range which is the first threshold value Tth1 is determined to be the high-temperature abnormal temperature or the low-temperature abnormal temperature. For example, in FIG. 11, if the temperature of the first threshold value Tth1 with which the determination of high-temperature abnormality is made is set to 240° C., if the detected temperature Td exceeds 240° C., the detected temperature Td is determined as the "high-temperature abnormality temperature".

Further, for example, in FIG. 12, if the temperature of the first threshold value Tth1 with which the determination of low-temperature abnormality is made is set to 40° C., if the detected temperature Td falls below 40° C., the detected temperature Td is determined as the "low-temperature abnormality temperature". In the above example, although the high-temperature abnormal temperature on a high temperature side was set to 240° C. and the low-temperature abnormal temperature on a low temperature side was set to 40° C. as the allowable temperature range of the first threshold value Th1, the high-temperature and low-temperature abnormal temperatures are not limited to these set temperatures, and may be freely set or based on design specifications. Further, a configuration in which the setting temperature can be changed as appropriate according to an installation environment of the apparatus and a situation of the apparatus may be adopted. In these determination results, if there is no abnormality in temperature and the transition of variation in the detected temperature Td is less than the target temperature within the allowable temperature range, the target temperature determination circuit 91 outputs an instruction signal for instructing heating/heating stop by the heater to the system controller 13.

If the instruction signal for heating by the heater is received, the system controller 13 controls the heater power supply circuit 149 to start supplying power to the heater unit 73 or to increase the amount of power to be supplied to the heater unit 73. On the other hand, in the comparison result, if the detected temperature Td is equal to or higher than the target temperature within the allowable temperature range, the target temperature determination circuit 91 outputs the instruction signal to stop heating by the heater to the system controller 13. If the instruction signal to stop heating by the heater is received, the system controller 13 controls the heater power supply circuit 149 to stop the power supply to the heater unit 73 or reduce the amount of power to be supplied to the heater unit 73. The system controller 13 may indirectly control the heater power supply circuit 149 through the heater energization control circuit 14.

If the detected temperature Td exceeds the upper and lower limits within the allowable temperature range of the first threshold value, the target temperature determination circuit 91 outputs the detected temperature Td to the difference arithmetic circuit 92.

The difference arithmetic circuit 92 obtains the current temperature difference Tc by calculating the difference between the detected temperature Td and the estimated WAE temperature value from the coefficient addition circuit 84 of the heater energization control circuit 14. The obtained current temperature difference Tc is output to the temperature abnormality determination circuit 93.

The storage circuit 94 stores at least the first threshold value Tth1 and the second threshold value Tth2 in advance. The first threshold value Tth1 is used to determine whether the detected temperature Td is the high-temperature abnormal temperature or the low-temperature abnormal temperature. In this example, for the first threshold value Tth1, as the upper limit of the allowable temperature range, a set temperature for determining the high-temperature abnormal temperature is set to 240° C., and as the lower limit of the allowable temperature range, a set temperature for determining the low-temperature abnormal temperature is set to 40° C.

The second threshold value Tth2 is a threshold value obtained by setting a temperature range for a temperature difference between the estimated WAE temperature value and the detected temperature by the temperature sensor in normal time. The second threshold value Tth2 is used to determine whether there is an abnormality on the control circuit side or the temperature sensor side by comparing the second threshold value Tth2 with the temperature difference Tc between the detected temperature Td with the WAE estimated value. In the following description, for the second threshold Tth2, for example, an allowable temperature range having a temperature width of, for example, ±50° C. is set as a determination criterion with respect to the temperature difference between the estimated WAE temperature value and the detected temperature by the temperature sensor in normal time.

In the above example, although the high-temperature abnormal temperature on the high temperature side was set to 240° C. and the low-temperature abnormal temperature on the low temperature side was set to 40° C., as the allowable temperature range of the first threshold value Th1, and the second threshold value Th2 was set to ±50° C., the high-temperature and low-temperature abnormal temperatures are not limited to these set temperatures, and may be freely set or based on design specifications. Further, a configuration in which the setting temperature can be changed as appropriate according to an installation environment of the apparatus and a situation of the apparatus may be adopted.

If the detected temperature Td is determined to be the high-temperature abnormal temperature or the low-temperature abnormal temperature by the first threshold value, the temperature abnormality determination circuit 93 compares the current temperature difference Tc with the second threshold value Tth2 read from the storage circuit 94. In this comparison, the temperature abnormality determination circuit 93 determines whether the current temperature difference Tc is equal to or greater than the second threshold value Tth2 (temperature difference Tc≥second threshold value Tth2).

In the determination of the temperature abnormality determination circuit 93, if the current temperature difference Tc does not exceed the allowable temperature range of the second threshold value Tth2 (within allowable temperature range), it is determined that there is an abnormality in the temperature sensor unit. That is, the temperature sensor responds to the temperature rise or fall following the temperature change due to ON/OFF of the heater, but may have a gradual change in temperature compared to normal time, and may not reach the target temperature even if the power to be supplied is increased. For example, a case where a detection point of the temperature sensor, which is originally in contact with a measurement target, is separated from the measurement target, a case where an output value thereof is reduced due to a defect in the temperature sensor, and the like can be assumed. In such a case, a temperature value of the detected temperature Td, which is lower than that in normal time, is often detected.

On the other hand, in the determination of the temperature abnormality determination circuit 93, if the current temperature difference Tc is larger or smaller than the allowable temperature range of the second threshold value Tth2, it is determined that there is an abnormality on the circuit side. That is, since the output value of the temperature sensor follows the temperature change and changes more significantly than normal time, it is considered that there is an abnormality on the circuit side. The abnormality on the circuit side can be assumed to be failure of either the heater energization control circuit 14 or the heater power supply circuit 149.

If it is determined that a failure occurs, the temperature abnormality determination circuit 93 outputs a signal indicating the occurrence of abnormality to the system controller 13. The system controller 13 notifies the operator that repair is required. The operator or system controller 13 stops the operation of the image forming apparatus 1 after notifying the service call.

Figure 7:
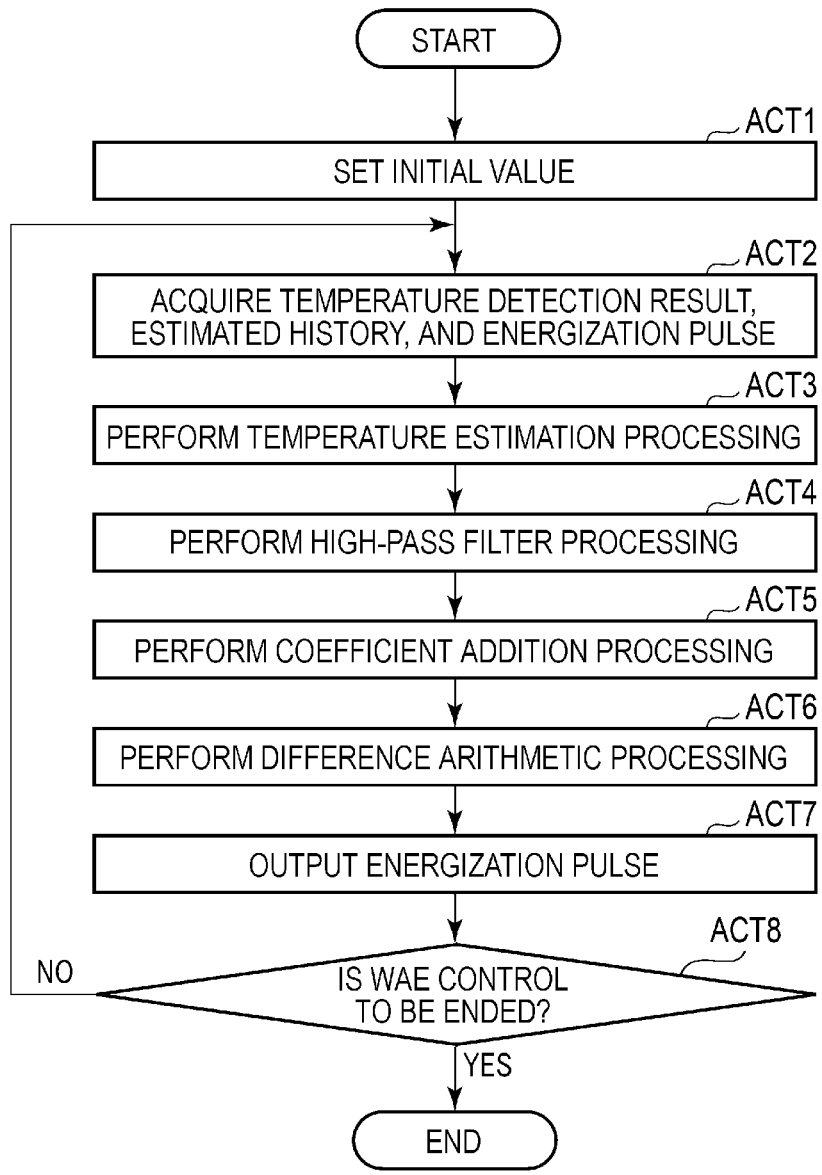
FIG. 7 is a flowchart for describing the WAE control.
Figure 8:
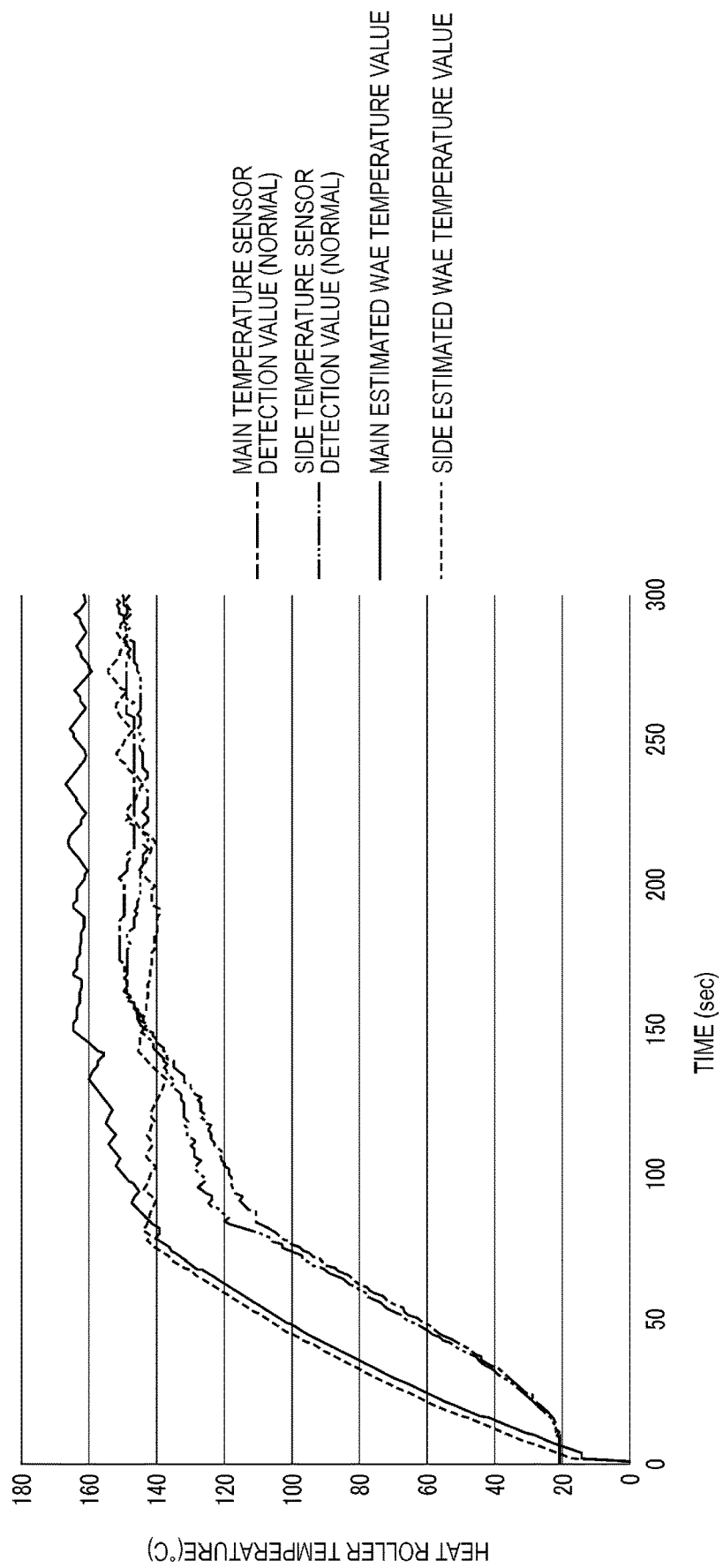
FIG. 8 is a diagram illustrating temperature characteristics of the fixing device under the WAE control.

Next, the WAE control will be described in detail with reference to the flowchart illustrated in FIG. 7. Here, FIG. 8 is a diagram illustrating the temperature characteristics of the detected value of the temperature sensor actually measured in normal time and the estimated WAE temperature value.

First, the heater energization control circuit 14 sets various initial values (ACT 1). For example, the heater energization control circuit 14 sets a coefficient in the coefficient addition circuit 84 and the target temperature TGT in the target temperature output circuit 85, based on a signal from the system controller 13.

The temperature estimation circuit 81 of the heater energization control circuit 14 acquires the detected temperature Td from the temperature sensor unit 74, the estimation history PREV (immediately preceding estimated WAE temperature value) from the estimation history holding circuit 82, and the energization pulse Ps from the control signal generation circuit 87 (ACT 2). In FIG. 8, during a warming-up period after the heater is turned ON, the detected temperature (output value) by the temperature sensor rises from room temperature to about 150° C., then warming-up is completed, and thereafter a constant temperature of around 150° C. is maintained. An actual surface temperature of the film unit 71 exhibits a fine wave shape change.

In addition, if the temperature sensor unit 74 may have a slightly slow response to temperature change due to the effects of the heat capacity thereof and the characteristics of a temperature-sensitive material, the detected temperature Td is detected in a state of being delayed or detected in a smoothed state with respect to the estimated WAE temperature value.

Next, the temperature estimation circuit 81 performs temperature estimation processing (ACT 3). That is, the temperature estimation circuit 81 generates the temperature estimation result EST based on the detected temperature Td, the estimation history PREV, and the energization pulse Ps. The temperature estimation circuit 81 outputs the temperature estimation result EST to the high-frequency component extraction circuit 83 and the estimation history holding circuit 82.

In general, heat transfer can be equivalently expressed by a CR time constant of an electrical circuit. Heat capacity is replaced by a capacitor C. A heat transfer resistance is replaced by a resistor R. A heat source is replaced with a DC voltage source. The temperature estimation circuit 81 applies an energization amount to the heater unit 73, the heat capacity of the film unit 71 and the like to a CR circuit, in which a value of each element is set in advance, to estimate the amount of heat given to the film unit 71. The temperature estimation circuit 81 estimates the surface temperature of the film unit 71 based on the amount of heat applied to the film unit 71, the detected temperature Td, and the estimated history PREV, and outputs the temperature estimation result EST.

The temperature estimation circuit 81 is repeatedly energized/interrupted from the DC voltage source based on the energization pulse Ps, the CR circuit operates according to the input voltage pulse, and an output voltage is generated. As a result, heat propagated to the surface of the film unit 71, which is the temperature control target, can be estimated. The heat of the film unit 71 flows out to an external environment through a space (external circuit of film unit 71) inside the fixing device 21. Therefore, the temperature estimation circuit 81 further includes a CR circuit for estimating heat flow from the film unit 71 to the external environment. The temperature estimation circuit 81 may further include a CR circuit for estimating the amount of heat flowing from the film unit 71 to the space inside the fixing device 21.

Next, the high-frequency component extraction circuit 83 performs high-pass filter processing for extracting a high-frequency component of the temperature estimation result EST (ACT 4). The high-frequency component HPF, which is a signal indicating the high-frequency component of the temperature estimation result EST, follows a change in an actual surface temperature of the film unit 71.

Next, the coefficient addition circuit 84 performs correction coefficient addition processing on the detected temperature Td (ACT 5). The coefficient addition circuit 84 multiplies the high-frequency component HPF by a preset coefficient, adds the high-frequency component HPF multiplied by the coefficient to the detected temperature Td, and calculates the estimated WAE temperature value.

The coefficient addition circuit 84 calculates the estimated WAE temperature value by adjusting a value of the high-frequency component HPF to be added to the detected temperature Td with a coefficient. For example, if the coefficient is 1, the coefficient addition circuit 84 directly adds the high-frequency component HPF to the detected temperature Td. Further, for example, if the coefficient is 0.1, the coefficient addition circuit 84 adds a value of one-tenth of the high-frequency component HPF to the detected temperature Td. In this case, the effect of the high-frequency component HPF is almost lost, and the temperature becomes close to the detected temperature Td. Further, for example, if the coefficient is 1 or more, the effect of the high-frequency component HPF can be expressed more strongly. An experimental result shows that, as the coefficient set in the coefficient addition circuit 84, a very extreme value is not good but a value close to 1 is good.

In the WAE control, a fine change in the surface temperature of the film unit 71 is estimated based on the detected temperature Td and the high-frequency component HPF of the temperature estimation result EST. The estimated WAE temperature value is a value that appropriately follows the surface temperature of the film unit 71.

The difference comparison circuit 86 calculates the difference DIF between the target temperature TGT and the estimated WAE temperature value from the coefficient addition circuit 84, and outputs the difference DIF to the control signal generation circuit 87 (ACT 6).

The control signal generation circuit 87 generates the energization pulse Ps based on the difference DIF. The control signal generation circuit 87 outputs the energization pulse Ps to the power supply circuit 88 and the temperature estimation circuit 81 (ACT 7). The power supply circuit 88 outputs the power PC, which is a control signal, to the heater power supply circuit 149 of the heater unit 73, based on the energization pulse Ps.

The difference DIF indicates a relationship between the target temperature TGT and the estimated WAE temperature value. For example, if the relationship is estimated WAE temperature value≥target temperature TGT, by performing control such as narrowing the width of the energizing pulse Ps or reducing the frequency, an energization amount to the heater unit 73 is reduced and the surface temperature of the film unit is lowered. If the relationship is estimated WAE temperature value<target temperature TGT, by widening the width of the energization pulse Ps or increasing the frequency thereof, an energization amount to the heater unit 73 is increased and the surface temperature of the film unit is increased.

From the difference DIF, not only the vertical relationship between the estimated WAE temperature value and the target temperature TGT, but also how far the estimated WAE temperature value and the target temperature TGT are separated from each other can be grasped. For example, if the difference DIF (absolute value thereof) is a large value, the difference between the estimated WAE temperature value and the target temperature TGT is large, and thus the control described above may be greatly changed. Further, for example, if the difference DIF (absolute value thereof) is a small value, the difference between the estimated WAE temperature value and the target temperature TGT is small, and thus the control described above may be performed gently.

The processor 22 of the system controller 13 determines whether to end the WAE control (ACT 8). If it is determined to continue the WAE control without ending the WAE control in ACT 8 (NO in ACT 8), the processor 22 proceeds to the processing of ACT 2 described above. On the other hand, if it is determined to end the WAE control according to the stop of the apparatus by the OFF operation of the main power switch 24 (YES in ACT 8), the processor 22 ends the processing routine.

In this way, when performing the processing of a certain cycle (relevant cycle), the heater energization control circuit 14 performs the WAE control based on the values in the previous cycle (energization pulse Ps and temperature estimation result EST: estimation history PREV) and the detected temperature Td in the relevant cycle. That is, the heater energization control circuit 14 inherits the values in the next cycle. The heater energization control circuit 14 recomputes the temperature estimation computation based on the previous computation history. Therefore, the heater energization control circuit 14 is always performing computation during operation. In the heater energization control circuit 14, the computation result is held in a memory or the like and reused in the computation in the next cycle.

Figure 10:
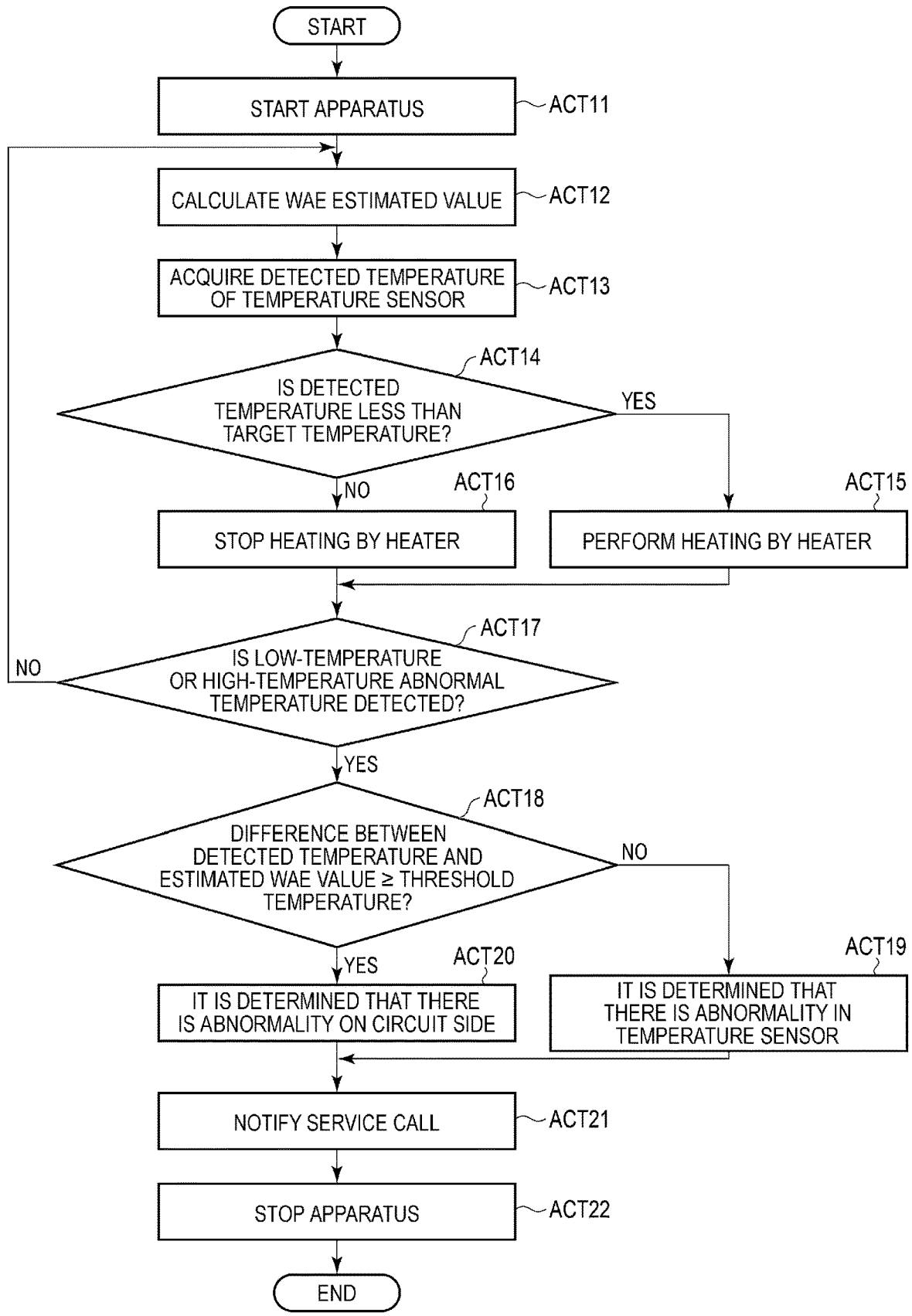
FIG. 10 is a flowchart for describing abnormal temperature detection.
Figure 11:
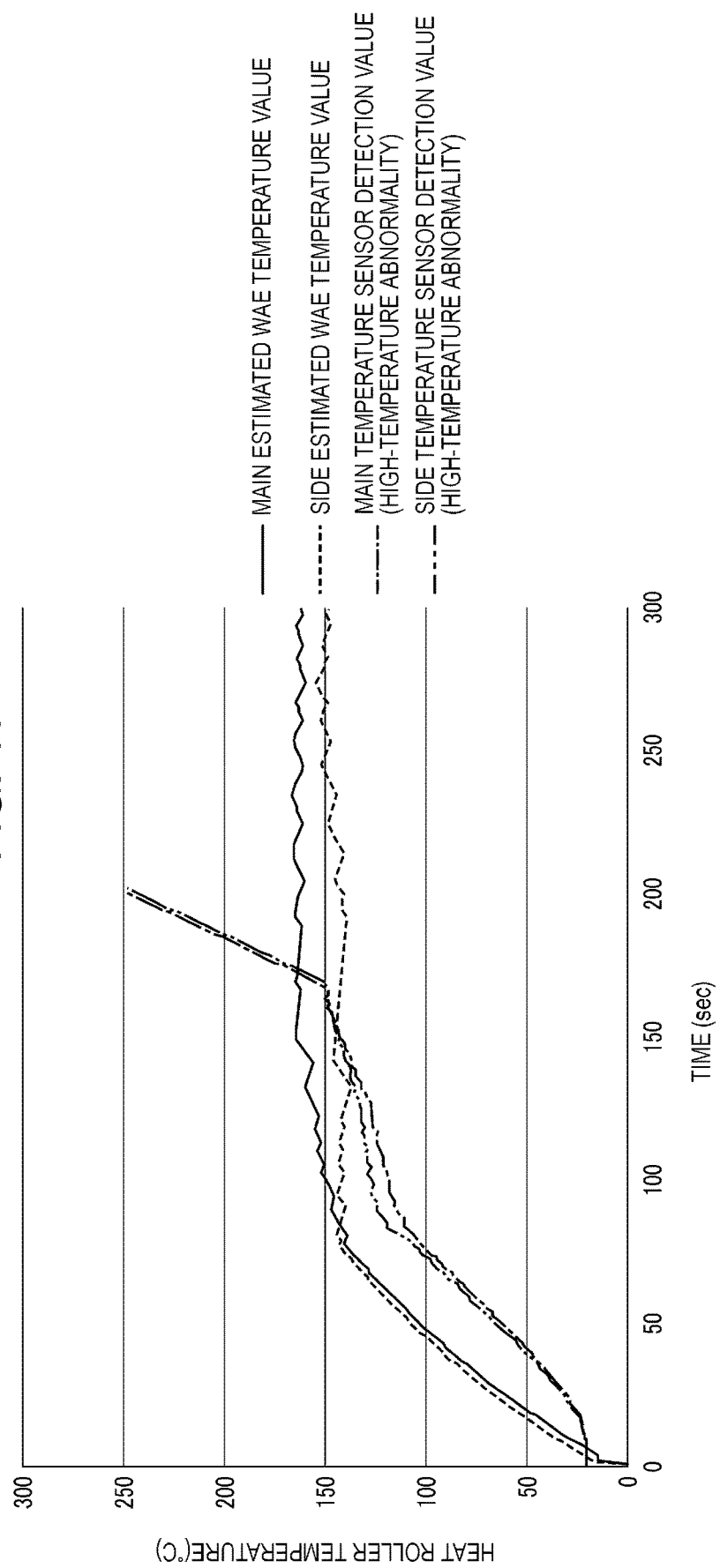
FIG. 11 is a diagram illustrating the temperature characteristics if a detected temperature by the temperature sensor becomes a high-temperature abnormality.

Next, temperature control including temperature abnormality detection by the temperature abnormality detection circuit 25 of the embodiment will be described with reference to the flowchart illustrated in FIG. 10. In this example, a configuration example in which the temperature abnormality detection circuit 25 is mounted in the image forming apparatus 1 is assumed. FIG. 11 is a diagram illustrating temperature characteristics if the detected temperature by the temperature sensor unit 74 becomes the high-temperature abnormality. FIG. 12 is a diagram illustrating the temperature characteristics if the detected temperature by the temperature sensor unit 74 becomes the low-temperature abnormality.

First, the image forming apparatus 1 is started by turning ON the main power switch 24 (ACT 11). The system controller 13 of the image forming apparatus 1 puts each component in an initial state in order to execute printing. At this time, the heater energization control circuit 14 supplies power to the heater unit 73 to heat the first to third heaters 155, 156, 157 of the film unit 71, and warming-up for starting printing is started. Along with the warming-up, the WAE control is started and the estimated WAE temperature value is calculated (ACT 12). At this time, as illustrated in FIG. 7, the detected temperature Td detected by the temperature sensor unit 74 rises from room temperature, and the estimated WAE temperature value rises from 0° C.

Next, after the warming-up is ended, the temperature abnormality detection circuit 25 acquires the detected temperature Td from the temperature sensor unit 74 and inputs the detected temperature Td to the target temperature determination circuit 91 (ACT 13).

The target temperature determination circuit 91 compares the detected temperature Td detected by the temperature sensor unit 74 with a preset target temperature TGT, and determines whether the detected temperature Td is less than the target temperature TGT (ACT 14). In this determination, if the detected temperature Td is less than the target temperature (YES in ACT 14), the target temperature determination circuit 91 outputs an instruction signal to heat the heater to the system controller 13 (ACT 15). The system controller 13 receives the instruction signal to heat the heater, and controls the heater power supply circuit 149 to start (turn ON) the supply of power to the heater unit 73 or increase the amount of power to be supplied to the heater unit 73.

On the other hand, in the determination of ACT 14, if the detected temperature Td is equal to or higher than the target temperature (NO in ACT 14), the target temperature determination circuit 91 outputs an instruction signal to stop heating by the heater to the system controller 13 (ACT 16). The system controller 13 receives the instruction signal to stop heating by the heater, and controls the heater power supply circuit 149 to stop (turn OFF) the supply of power to the heater unit 73 or reduce the amount of power to be supplied to the heater unit 73. The system controller 13 may output the instruction signal for turning ON/OFF the heater to the heater power supply circuit 149 through the heater energization control circuit 14.

Next, the target temperature determination circuit 91 determines whether the detected temperature Td is within the allowable temperature range that is the preset first threshold value, that is, whether the detected temperature Td is the low-temperature abnormal temperature or the high-temperature abnormal temperature (ACT 17). Here, if the temperature determined as high-temperature abnormality within the allowable temperature range is set to, for example, 240° C., if the detected temperature Td exceeds 240° C., the detected temperature Td is determined as the "high-temperature abnormality temperature" (YES in ACT 17). Similarly, if the temperature determined as low-temperature abnormality is set to, for example, 40° C., if the detected temperature Td falls below 40° C., the detected temperature Td is determined as the "low-temperature abnormality temperature". If the detected temperature Td is determined to be the low-temperature abnormal temperature or the high-temperature abnormal temperature, the processing routine proceeds to ACT 18. On the other hand, if the detected temperature Td is within the allowable temperature range of the first threshold value (40° C.≤Td≤240° C.), it is determined that the operation is normal (NO in ACT 17), the processing routine returns to ACT 12. Subsequently, the heater is heated/stopped by the WAE control, and the WAE estimated value is calculated.

The determination of whether the allowable temperature range of the first threshold value for the detected temperature Td by the target temperature determination circuit 91 is exceeded may be started from the start of warming-up, or may be started after completion of the warming-up. The first threshold value used for this determination may be set separately as a threshold value for the allowable temperature range for warming-up.

Next, in the determination of ACT 17 (YES in ACT 17) described above, if it is determined that the detected temperature Td is the low-temperature abnormal temperature or the high-temperature abnormal temperature, the difference arithmetic circuit 92 obtains the current temperature difference Tc by calculating the difference between the detected temperature Td and the estimated WAE temperature value from the coefficient addition circuit 84 of the heater energization control circuit 14. The obtained current temperature difference Tc is output to the temperature abnormality determination circuit 93.

Figure 12:
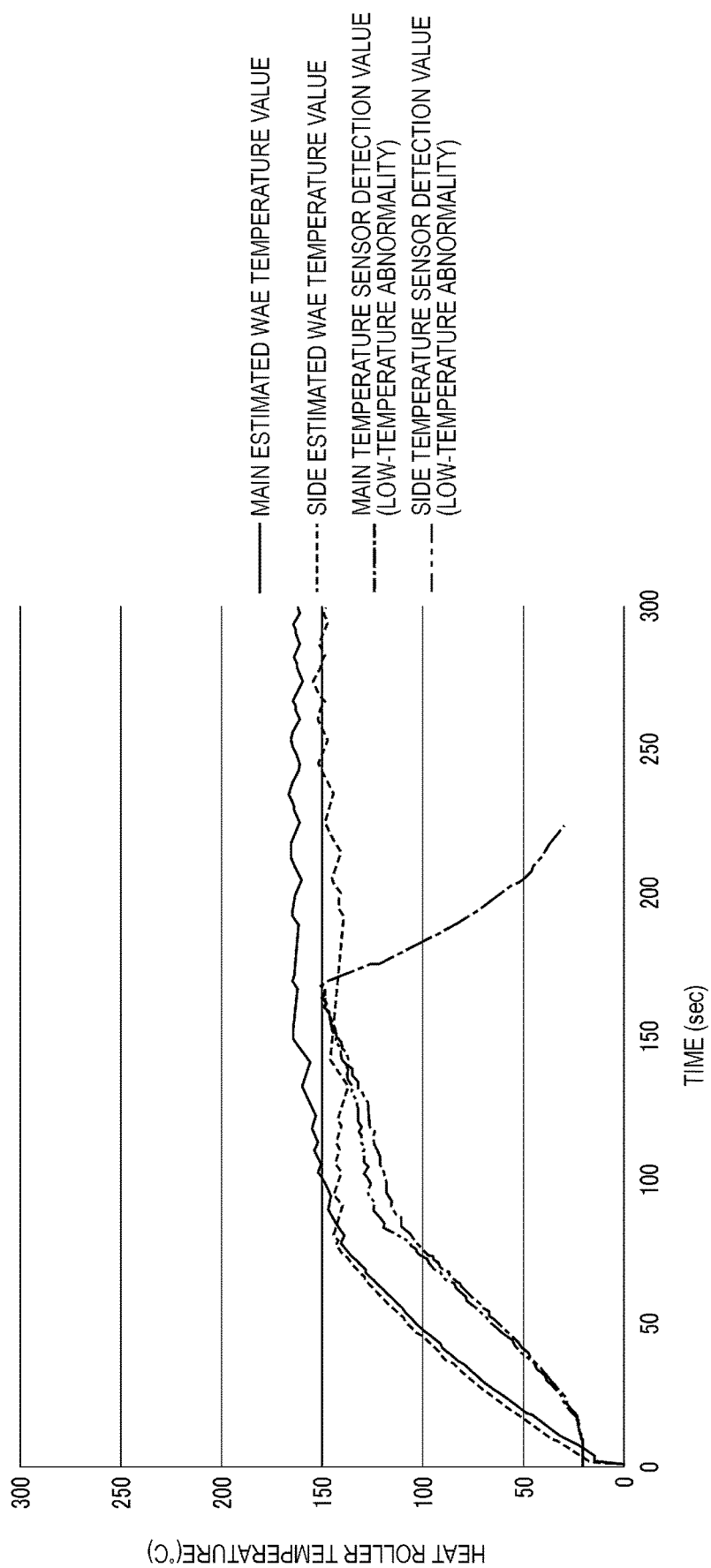
FIG. 12 is a diagram illustrating the temperature characteristics if the detected temperature by the temperature sensor becomes a low-temperature abnormality.

As illustrated in FIG. 12, the low-temperature abnormal temperature of the detected temperature Td has a temperature characteristic in which a detected value of main temperature sensor actually measured by the second temperature sensor 171 that detects the temperature of the first heater 155 and a detected value of side temperature sensor actually measured by the second temperature sensor 172 that detects the temperature of the second heater 156 decrease linearly. Similarly, as illustrated in FIG. 11, the high-temperature abnormal temperature of the detected temperature Td has a temperature characteristic in which the detected value of main temperature sensor and the detected value of side temperature sensor that are both actually measured rise linearly.

Next, the temperature abnormality determination circuit 93 compares the current temperature difference Tc with the second threshold value Tth2 read from the storage circuit 94, and determines whether the current temperature difference Tc is equal to or greater than the second threshold value Tth2 (temperature difference Tc≥second threshold value Tth2) (ACT 18). Here, it is assumed that the second threshold value Tth2 is set to a temperature width of ±50° C. as the allowable temperature range with the temperature difference obtained in normal time as described above as a reference.

In the determination of the temperature abnormality determination circuit 93 in ACT 18, if the current temperature difference Tc does not exceed the allowable temperature range of the second threshold value Tth2 (NO in ACT 18), that is, if +50° C.>current temperature difference Tc>−50° C., it is determined that there is an abnormality in the temperature sensor unit (ACT 19). In this determination, the temperature sensor responds to the temperature rise or fall following the temperature change due to ON/OFF of the heater, but may have a gradual change in temperature compared to normal time, and may not reach the target temperature even if the power to be supplied is increased. In such a case, for example, a case where a detection point of the temperature sensor, which is originally in contact with a measurement target, is separated from the measurement target, a case where an output value thereof is reduced due to a defect in the temperature sensor, and the like can be assumed. In such a case, a temperature value of the detected temperature Td, which is lower than that in normal time, is often detected.

On the other hand, in the determination of the temperature abnormality determination circuit 93 in ACT 18, if the current temperature difference Tc is equal to or greater than the allowable temperature range of the second threshold value Tth2 (YES in ACT 18), that is, if the current temperature difference Tc≥+50° C. or the current temperature difference Tc≤−50° C., it is determined that there is an abnormality on the circuit side. That is, the output value of the temperature sensor follows the temperature change, but the output value of the temperature sensor changes more significantly than normal time, and thus it is considered that there is an abnormality on the circuit side. In the abnormality on the circuit side, either of the heater energizing control circuit 14 that outputs output control and power or the heater power supply circuit 149 can be assumed to be faulty.

If it is determined that a failure occurs, the temperature abnormality determination circuit 93 outputs a signal indicating the occurrence of abnormality to the system controller 13. The system controller 13 notifies the operator that repair is required (ACT 21). The operator or system controller 13 stops the operation of the image forming apparatus 1 after notifying the service call (ACT 22), and ends the processing routine.

As described above, according to the temperature control device of the embodiment, the mounted temperature abnormality detection circuit can determine whether the detected temperature Td acquired by the temperature sensor provided in the fixing device is the low-temperature abnormality or the high-temperature abnormality. If the detected temperature Td is the low-temperature abnormal temperature or the high-temperature abnormal temperature, the current temperature difference Tc is obtained from the current detected temperature and the estimated WAE temperature value, and the current temperature difference is compared with the second threshold value Tth2. If the current temperature difference is larger or smaller than the allowable temperature range of the second threshold value Tth2, it can be determined that there is an abnormality on the control circuit side, and if the current temperature difference Tc does not reach the second threshold value Tth2 and is within the allowable temperature range, it can be determined that there is an abnormality in the temperature sensor. The control circuit side is mainly the heater energization control circuit 14, and may also include the heater power supply circuit 149 or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A temperature control device configured to supply power to a heater of a fixing device, thereby controlling a temperature control target to which heat is propagated from the heater so as to reach a target temperature, comprising:
   a heater power supply circuit configured to supply power to the heater;
   a temperature sensor configured to measure a detected temperature from the temperature control target;
   a temperature estimation circuit configured to estimate an estimated temperature value of the temperature control target by the detected temperature;
   a control signal generation circuit configured to output a control signal for controlling the power supplied by the heater power supply circuit based on the estimated temperature value of the temperature control target estimated by the temperature estimation circuit and the target temperature; and
   a temperature abnormality detection circuit configured to determine whether an abnormality exists in the temperature sensor or on a circuit side based on a comparison result of the detected temperature acquired by the temperature sensor and the estimated temperature value.

2. The temperature control device according to claim 1, wherein the temperature abnormality detection circuit determines whether an abnormality exists in the temperature sensor or on the circuit side based on a comparison result of a temperature difference calculated from the detected temperature and the estimated temperature value with a threshold value calculated from a first detected temperature of the temperature sensor in a non-abnormality time and the estimated temperature value.

3. The temperature control device according to claim 1, wherein the temperature estimation circuit estimates the estimated temperature value of the temperature control target by the detected temperature, heat capacity of the heater based on energization to the heater, the control signal, and a thermal resistance of the fixing device.

4. The temperature control device according to claim 1, wherein
   the temperature abnormality detection circuit comprises:
      a storage circuit configured to store a first threshold value and a second threshold value made up of the threshold value, each of the first and second threshold values having an allowable temperature range,
      a target temperature determination circuit configured to determine whether the detected temperature is a low-temperature abnormal temperature or high-temperature abnormal temperature that exceeds a lower limit or upper limit of the allowable temperature range by comparison with the first threshold value,
      a difference arithmetic circuit configured to obtain the current temperature difference from the current detected temperature and the estimated temperature value if the detected temperature is the low-temperature abnormality or the high-temperature abnormality, and
      a temperature abnormality determination circuit configured to determine whether the temperature sensor is abnormal or the circuit side is abnormal, depending on whether the current temperature difference is within the allowable temperature range of the second threshold value by comparison with the second threshold value.

5. The temperature control device according to claim 4, wherein
   the temperature abnormality detection circuit is configured to determine that an abnormality exists on the circuit side if the current temperature difference is larger or smaller than the allowable temperature range of the second threshold value, and determine that an abnormality exists in the temperature sensor if the current temperature difference does not reach the second threshold value and is within the allowable temperature range.

6. The temperature control device according to claim 1, further comprising:
   a heat transfer member disposed between the heater and the temperature sensor to be abutted on the heater and the temperature sensor, wherein
   in the heat transfer member, a space region is formed by a groove portion between an abutment surface with the heater.

7. The temperature control device according to claim 1, wherein
   the heater power supply circuit comprises a triac.

8. An image forming apparatus, comprising
   a conveyance device;
   a toner supply device;
   a fixing device; and
   a temperature control device configured to supply power to a heater of the fixing device, thereby controlling a temperature control target to which heat is propagated from the heater so as to reach a target temperature, comprising:
      a heater power supply circuit configured to supply power to the heater;
      a temperature sensor configured to measure a detected temperature from the temperature control target;
      a temperature estimation circuit configured to estimate an estimated temperature value of the temperature control target by the detected temperature;
      a control signal generation circuit configured to output a control signal for controlling the power supplied by the heater power supply circuit based on the estimated temperature value of the temperature control target estimated by the temperature estimation circuit and the target temperature; and
      a temperature abnormality detection circuit configured to determine whether an abnormality exists in the temperature sensor or on a circuit side based on a comparison result of the detected temperature acquired by the temperature sensor and the estimated temperature value.

9. The image forming apparatus according to claim 8, wherein the temperature abnormality detection circuit determines whether an abnormality exists in the temperature sensor or on the circuit side based on a comparison result of a temperature difference calculated from the detected temperature and the estimated temperature value with a threshold value calculated from a first detected temperature of the temperature sensor in a non-abnormality time and the estimated temperature value.

10. The image forming apparatus according to claim 8, wherein the temperature estimation circuit estimates the estimated temperature value of the temperature control target by the detected temperature, heat capacity of the heater based on energization to the heater, the control signal, and a thermal resistance of the fixing device.

11. The image forming apparatus according to claim 8, wherein
the temperature abnormality detection circuit comprises:
a storage circuit configured to store a first threshold value and a second threshold value made up of the threshold value, each of the first and second threshold values having an allowable temperature range,
a target temperature determination circuit configured to determine whether the detected temperature is a low-temperature abnormal temperature or high-temperature abnormal temperature that exceeds a lower limit or upper limit of the allowable temperature range by comparison with the first threshold value,
a difference arithmetic circuit configured to obtain the current temperature difference from the current detected temperature and the estimated temperature value if the detected temperature is the low-temperature abnormality or the high-temperature abnormality, and
a temperature abnormality determination circuit configured to determine whether the temperature sensor is abnormal or the circuit side is abnormal, depending on whether the current temperature difference is within the allowable temperature range of the second threshold value by comparison with the second threshold value.

12. The image forming apparatus according to claim 11, wherein
the temperature abnormality detection circuit is configured to determine that an abnormality exists on the circuit side if the current temperature difference is larger or smaller than the allowable temperature range of the second threshold value, and determine that an abnormality exists in the temperature sensor if the current temperature difference does not reach the second threshold value and is within the allowable temperature range.

13. The image forming apparatus according to claim 8, further comprising:
a heat transfer member disposed between the heater and the temperature sensor to be abutted on the heater and the temperature sensor, wherein
in the heat transfer member, a space region is formed by a groove portion between an abutment surface with the heater.

14. The image forming apparatus according to claim 8, wherein
the heater power supply circuit comprises a triac.

15. A temperature control method for controlling a temperature control target to which heat is propagated from the heater so as to reach a target temperature, comprising:
supplying power to a heater of a fixing device using a heater power supply circuit;
measuring a detected temperature from the temperature control target using a temperature sensor;
estimating an estimated temperature value of the temperature control target by the detected temperature using a temperature estimation circuit;
outputting, using a control signal generation circuit, a control signal for controlling the power supplied by the heater power supply circuit based on the estimated temperature value of the temperature control target estimated by the temperature estimation circuit and the target temperature; and
determining, using a temperature abnormality detection circuit, whether an abnormality exists in the temperature sensor or on a circuit side based on a comparison result of the detected temperature acquired by the temperature sensor and the estimated temperature value.

16. The temperature control method according to claim 15, further comprising:
determining, using the temperature abnormality detection circuit, whether an abnormality exists in the temperature sensor or on the circuit side based on a comparison result of a temperature difference calculated from the detected temperature and the estimated temperature value with a threshold value calculated from a first detected temperature of the temperature sensor in a non-abnormality time and the estimated temperature value.

17. The temperature control method according to claim 15, further comprising:
estimating, using the temperature estimation circuit, the estimated temperature value of the temperature control target by the detected temperature, heat capacity of the heater based on energization to the heater, the control signal, and a thermal resistance of the fixing device.

18. The temperature control method according to claim 15, further comprising:
storing, using a storage circuit, a first threshold value and a second threshold value made up of the threshold value, each of the first and second threshold values having an allowable temperature range;
determining, using a target temperature determination circuit, whether the detected temperature is a low-temperature abnormal temperature or high-temperature abnormal temperature that exceeds a lower limit or upper limit of the allowable temperature range by comparison with the first threshold value;
obtaining, using a difference arithmetic circuit, the current temperature difference from the current detected temperature and the estimated temperature value if the detected temperature is the low-temperature abnormality or the high-temperature abnormality, and
determining, using a temperature abnormality determination circuit, whether the temperature sensor is abnormal or the circuit side is abnormal, depending on whether the current temperature difference is within the allowable temperature range of the second threshold value by comparison with the second threshold value.

19. The temperature control method according to claim 18, further comprising:
determining that an abnormality exists on the circuit side if the current temperature difference is larger or smaller than the allowable temperature range of the second threshold value, and determining that an abnormality exists in the temperature sensor if the current temperature difference does not reach the second threshold value and is within the allowable temperature range.

20. The temperature control method according to claim 15, wherein
the heater power supply circuit comprises a triac.

* * * * *